United States Patent
Chakarian

(10) Patent No.: US 12,462,369 B2
(45) Date of Patent: Nov. 4, 2025

(54) METHOD FOR IMAGE-BASED SENSOR TRACE ANALYSIS

(71) Applicant: Applied Materials, Inc., Santa Clara, CA (US)

(72) Inventor: Varoujan Chakarian, Northridge, CA (US)

(73) Assignee: Applied Materials, Inc., Santa Clara, CA (US)

( * ) Notice: Subject to any disclaimer, the term of this patent is extended or adjusted under 35 U.S.C. 154(b) by 85 days.

(21) Appl. No.: 18/234,713

(22) Filed: Aug. 16, 2023

(65) Prior Publication Data
US 2025/0061557 A1  Feb. 20, 2025

(51) Int. Cl.
*G06T 7/00* (2017.01)
*G06V 10/147* (2022.01)

(52) U.S. Cl.
CPC .......... *G06T 7/0004* (2013.01); *G06V 10/147* (2022.01); *G06T 2207/10061* (2013.01); *G06T 2207/30148* (2013.01)

(58) Field of Classification Search
CPC ......... G06T 7/0004; G06T 2207/10061; G06T 2207/30148; G06V 10/147
USPC .................................................. 382/100, 103
See application file for complete search history.

(56) References Cited

U.S. PATENT DOCUMENTS

| | | | |
|---|---|---|---|
| 11,232,368 B2 * | 1/2022 | Tashman | G05B 23/0283 |
| 2007/0230567 A1 * | 10/2007 | Wang | H04N 19/29 |
| | | | 375/E7.199 |
| 2017/0109646 A1 * | 4/2017 | David | G03F 7/70625 |
| 2019/0146032 A1 * | 5/2019 | Stine | G06N 20/00 |
| | | | 714/737 |
| 2020/0089214 A1 | 3/2020 | Cella et al. | |
| 2021/0103489 A1 * | 4/2021 | Burch | G06F 18/241 |
| 2021/0334608 A1 | 10/2021 | Honda et al. | |

(Continued)

FOREIGN PATENT DOCUMENTS

| | | |
|---|---|---|
| KR | 20230045115 A | 4/2023 |
| WO | 2021232149 A1 | 11/2021 |
| WO | 2023/146924 A1 | 8/2023 |

OTHER PUBLICATIONS

International Search Report and Written Opinion for International Application No. PCT/US2024/042576, mailed Dec. 4, 2024, 8 Pages.

*Primary Examiner* — Sheela C Chawan
(74) *Attorney, Agent, or Firm* — Lowenstein Sandler LLP

(57) ABSTRACT

A method includes grouping signal traces based on signal trace characteristics. The method includes generating an image, a first dimension of the image corresponding to the signal traces, and a second dimension of the image corresponding to time values, where a visual indicator corresponds to a signal trace characteristic of a signal trace at a time value, the signal trace corresponds to a row or column of the first dimension, and the time value corresponds the second dimension. The method includes detecting a defect in operation of components of manufacturing equipment associated with the signal traces based on a deviation of visual indicators in a row or column from a visual indicator of a respective group of visual indicators associated with signal traces with similar signal trace characteristics. The method includes classifying the defect based on a signal trace corresponding to the row or column of the image.

20 Claims, 8 Drawing Sheets

(56) References Cited

U.S. PATENT DOCUMENTS

2021/0396542 A1* 12/2021 Toutov ................. G01C 21/005
2023/0076545 A1    3/2023 Kim et al.

* cited by examiner

METHOD FOR IMAGE-BASED SENSOR
TRACE ANALYSIS

TECHNICAL FIELD

The present disclosure relates to determining sensor trace analysis, and, more particularly, to image-based sensor trace analysis.

BACKGROUND

Products can be produced by performing one or more manufacturing processes using manufacturing equipment. For example, substrate processing equipment can be used to produce substrates via substrate processing operations.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure includes a method including grouping multiple signal traces based on at least one of a plurality of signal trace characteristics, the plurality of signal traces associated with one or more components of manufacturing equipment. The method further includes generating an image comprising groups of visual indicators associated with signal traces with similar signal trace characteristics, where a first dimension of the image corresponds to at least one of the multiple signal traces, and a second dimension of the image corresponds to a plurality of time values, wherein a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image. The method further includes detecting a defect in operation of at least one of the one or more components of the manufacturing equipment based on a deviation of one of the visual indicators in at least one portion of at least one row or column of the image from a visual indicator of a respective group. The method further includes classifying the defect based on a signal trace corresponding to the at least one row or column of the image.

A further aspect of the disclosure includes a non-transitory computer-readable storage medium comprising instructions that, when executed by a processing device operatively coupled to a memory, performs operations. The operations include grouping multiple signal traces based on at least one of multiple signal trace characteristics, the multiple signal traces associated with one or more components of manufacturing equipment. The operations further include generating an image comprising groups of visual indicators associated with signal traces with similar signal trace characteristics, where a first dimension of the image corresponds to at least one of the plurality of signal traces, and a second dimension of the image corresponds to a plurality of time values, wherein a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image. The operations further include detecting a defect in operation of at least one of the one or more components of the manufacturing equipment based on a deviation of one of the visual indicators in at least one portion of at least one row or column of the image from a visual indicator of a respective group. The operations further include classifying the defect based on a signal trace corresponding to the at least one row or column of the image.

A further aspect of the disclosure includes a system including a memory and a processing device coupled to the memory. The processing device is to group multiple signal traces based on at least one of multiple signal trace characteristics, the multiple signal traces associated with one or more components of manufacturing equipment. The processing device is further to generate comprising groups of visual indicators associated with signal traces with similar signal trace characteristics, where a first dimension of the image corresponds to at least one of the plurality of signal traces, and a second dimension of the image corresponds to a plurality of time values, wherein a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image. The processing device is further to detect a defect in operation of at least one of the one or more components of the manufacturing equipment based on a deviation of one of the visual indicators in at least one portion of at least one row or column of the image from a visual indicator of a respective group. The processing device is further to classify the defect based on a signal trace corresponding to the at least one row or column of the image.

BRIEF DESCRIPTION OF THE DRAWINGS

The present disclosure is illustrated by way of example, and not by way of limitation in the figures of the accompanying drawings.

DETAILED DESCRIPTION

Figure 1:
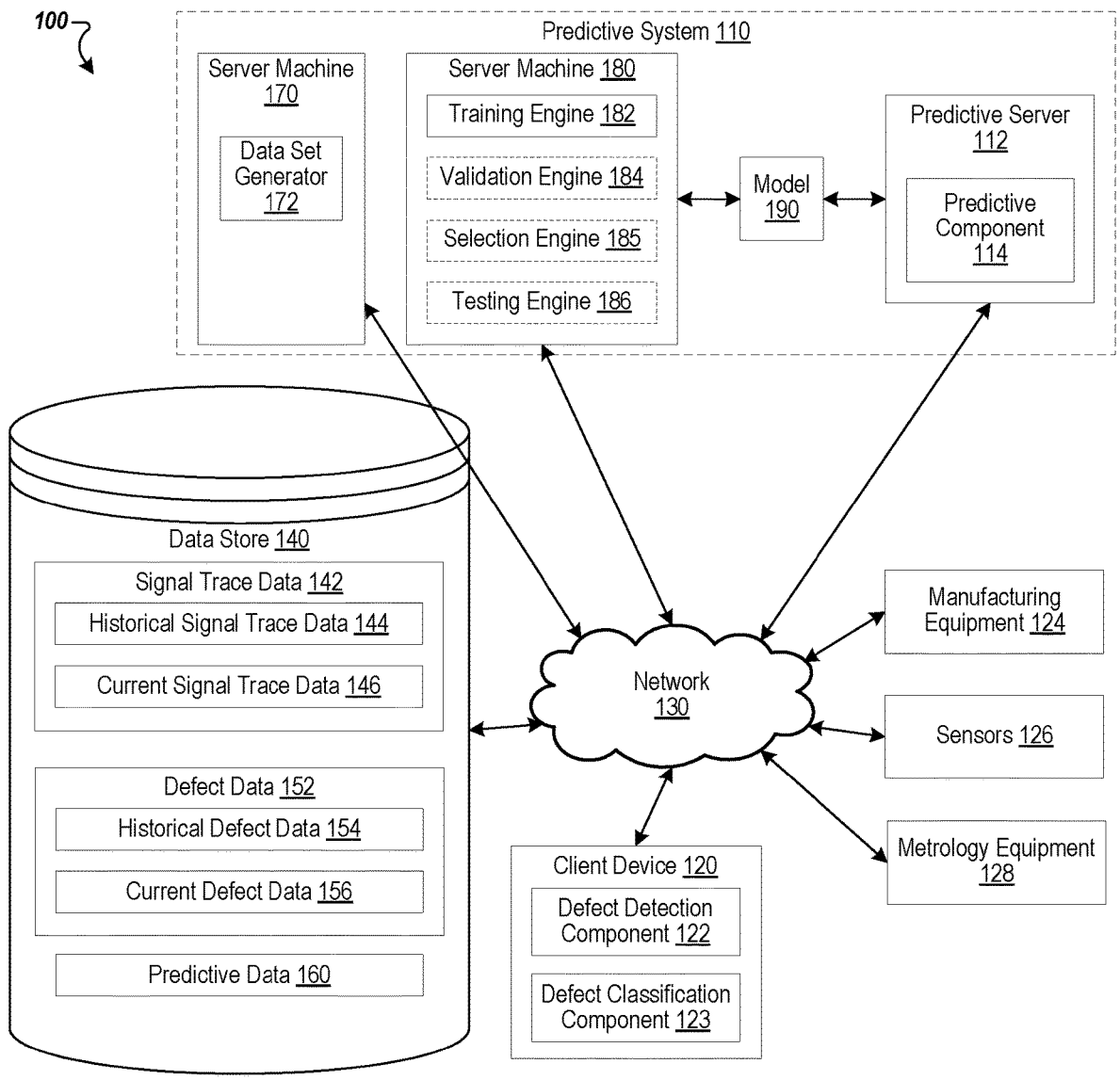
FIG. 1 is a block diagram illustrating an exemplary system architecture, according to some embodiments.

Described herein are technologies directed to image-based sensor trace analysis (e.g., fault analysis, chamber and tool matching, chamber and tool fingerprinting, etc.). Manufacturing equipment includes sensors that collect signal traces. Such signal traces are often used for various purposes, such as fault analysis, tool fingerprinting, and chamber and tool matching. For example, signal trace analysis can be used for fault analysis of a sensor exhibiting anomalous behavior, such as a sensor that is mis-calibrated, and can help to identify the root cause of the fault and enable a corrective action to be taken. With respect to tool fingerprinting, signal trace analysis may be used to compare signal traces, for example, before and after preventative maintenance to ensure the tool is behaving correctly and can help to identify any deviations in the behavior of the tool and enable proactive maintenance to be scheduled before the tool malfunctions. For chamber and tool matching, signal trace analysis may involve comparing signal traces for different chambers and/or tools running the same process to ensure that all chambers and/or tools behave the same way. This analysis can help to ensure consistent product quality and enable identification of any differences in the behavior of the chambers and/or tools and allow those differences to be addressed.

Conventionally, signal traces have been analyzed using traditional signal processing techniques, including means, maximums, minimums, ranges, principal component analysis, independent component analysis, Fast Fourier transform analysis, multi-variate correlation analysis, etc. However, these methods often lack sensitivity, are prone to error, and may not be adequate for precise analysis. For example, these methods may assume linear relationships and may fail to capture the complex and nonlinear nature of signal traces. Further, these methods may be limited in capturing intricate higher-order relationships and nonlinear dependencies among variables. Fast Fourier Transform analysis may focus on frequency content but may overlook time-varying dynamics and transient events in the data. Further, these methods may be less robust to noise, outliers, and variations commonly found in signal traces.

Aspects and implementations of the present disclosure address these and other shortcomings of the existing technology by performing image-based signal trace analysis. In particular, aspects and implementations of the present disclosure involve generating an image reflecting signal traces corresponding to the behavior of one or more components of the manufacturing equipment. The generated image may include a first dimension (e.g., corresponding to rows and/or columns) that corresponds to a subset of the signal traces grouped based on their characteristics that indicate behavior of corresponding components of the manufacturing equipment. A second dimension of the image may include time values (e.g., a timestamp, index in time, etc.) each indicating when a respective signal trace was sampled or resampled (e.g., a sampling rate was changed). The generated image may include groups of visual indicators associated with signal traces with similar signal trace characteristics, where a first visual indicator corresponds to a signal trace characteristic of a first signal trace of the multiple signal traces at a first time value of the multiple time values. The first signal trace corresponds to a first row or column with respect to the first dimension in the image, and the first time value corresponds to a first position with respect to the second dimension of the image.

A defect in operation of one of the components of the manufacturing equipment may be detected based on a deviation of one of the visual indicators in at least one portion of at least one row or column of the image from a visual indicator of a respective group. In such instances, the defect can be classified based on a signal trace corresponding to the at least one row or column of the image. In some embodiments, the visual indicator of the respective group may be a visual indicator of a respective group of a reference image. In some embodiments, a reference image may correspond to signal traces from an exemplary tool (e.g., a tool that is calibrated) and/or an exemplary run of a process or operation on the tool.

In some embodiments, detecting a defect in operation of one of the components of the manufacturing equipment can include providing the generated image as input to a trained machine learning model and obtaining an output of the trained machine learning model. An output can indicate detection of a defect in operation of one of the components of the manufacturing equipment.

In some embodiments, classifying a defect based on the signal trace corresponding to the at least one row or column of the image can include providing a signal trace ID identifying the row or column of the generated image containing the deviation as input to a trained machine learning model. An output can be obtained from the trained machine learning model, the output including a classification of the defect according to the component of the manufacturing equipment associated with the row or column of the generated image containing the deviation and corresponding to the signal trace ID.

Aspects of the present disclosure result in technological advantages. Aspects of the present disclosure avoid the error-prone conventional methods used for signal trace analysis by implementing image-based signal trace analysis, helping to accurately identify the root cause of a fault (e.g., via defect classification) and enable a corrective action to be taken. Image-based signal trace analysis allows for comparison of signal traces that have been grouped (e.g., based on signal trace characteristics), resampled (e.g., a sampling rate has been changed) to a uniform time sequence, normalized to a uniform scale, filtered, smoothed, increased in weight, grouped, converted into an image and segmented. Such methods result in accurate, precise, and sensitive image-based analysis. For example, grouping signal traces with similar characteristics allows signal traces with defects to be contrasted with signal traces without defects increasing sensitivity in image-based signal trace analysis. Further, by giving more weight to signal traces, signal trace defects are more easily identifiable (e.g., using image-based analysis) leading to more accurate signal trace defect detection and enabling precise classification of signal trace defects. Further, such methods reduce human error by employing trained machine learning models.

FIG. 1 is a block diagram illustrating an exemplary system 100 (exemplary system architecture), according to certain embodiments. The system 100 can include a client device 120, manufacturing equipment 124, sensors 126, metrology equipment 128, a predictive system 110, and a data store 140. In some embodiments, the predictive system 110 includes a predictive server 112. In some embodiments, the predictive system 110 further includes server machines 170 and 180.

In some embodiments, one or more of the client device 120, manufacturing equipment 124, sensors 126, metrology equipment 128, predictive server 112, data store 140, server machine 170, and/or server machine 180 are coupled to each other via a network 130 for generating predictive data 160 to perform image-based signal trace analysis of chamber and tool signal traces during substrate manufacturing. In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. In some embodiments, network 130 includes one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

Manufacturing equipment 124 can produce products, such as substrates, wafers, semiconductors, electronic devices, etc., following a recipe, process, or performing runs over a period of time. Manufacturing equipment 124 can include a processing chamber. Processing chambers can be adapted to carry out any number of processes on substrates. Manufacturing equipment 124 can include a tool. In some embodiments, a tool may perform multiple processing steps on substrates and may include processing chambers, load locks, robot arms for substrate handling, heating and cooling systems, gas delivery systems, vacuum pumps, exhaust systems, etc. In some embodiments, a tool may include sensors and monitoring systems to ensure precise control and measurement of the processing conditions. Tools can be adapted to carry out any number of processes on substrates. A same or different substrate processing operation can take place in each processing chamber, tool, or substrate processing area. Processing chambers and tools can include one or more sensors configured to capture data for a tool, a chamber, and/or a substrate before, after, or during a substrate processing operation. For example, the one or more sensors can be configured to capture temperature data, pressure data, flow data, humidity data, optical data, vibration data, plasma data, position data, load data, gas concentration data, accelerometer data, strain gauge data, capacitance data, proximity data, magnetic data, pH data, conductivity data, resistivity data, and particle data, spectral data, and/or the like associated with the environment within a processing chamber and/or tool before, after, or during the substrate processing operation.

In some embodiments, a processing chamber and/or tool can include sensors (e.g., sensors 126) and/or metrology equipment (e.g., metrology equipment 128) configured to generate in-situ sensor measurement values (e.g., sensor data) and/or metrology measurement values (e.g., metrology data) during a process performed at processing chamber and/or by a tool. In some embodiments, sensor measurement values and/or metrology measurement values may be a subset of signal trace data 142 and/or defect data 152. The sensors and/or metrology equipment can be operatively coupled to the system controller. In some embodiments, the metrology equipment can be configured to generate a metrology measurement value during particular instances of a processing operation. In some embodiments, the sensors can be configured to generate a sensor measurement value during particular instances of a processing operation. The system controller can, for example, generate an image (e.g., where a first dimension of the image corresponds to at least one of multiple signal traces and a second dimension of the image corresponds to time) based on the received metrology measurement values from the metrology equipment and/or the received sensor measurement values from the sensors.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers).

Manufacturing equipment 124 can perform a process on a substrate (e.g., a wafer, etc.) in at least one of a processing chamber, load lock, transfer chamber, wet bench, spin coater, photolithography system, CMP tool, annealing system, etc. Manufacturing equipment 124 can perform each process according to a process recipe. A process recipe defines a particular set of operations to be performed on the substrate during the process and can include one or more settings associated with each operation. For example, a deposition process recipe can include a temperature setting for the processing chamber, a pressure setting for the processing chamber, a flow rate setting for a precursor for a material included in the film deposited on the substrate surface, etc.

A recipe may include transitions and/or steps. For example, during an annealing operation, the temperature inside a processing chamber may transition from a first temperature to a second temperature. Such a change in a parameter of a manufacturing process may be a transition. In some embodiments, transitions and/or steps may be a point of interest where defects may be apparent and/or detectable when measured by a sensor or metrology equipment and shown in a corresponding signal trace (e.g., converted into an image). In some embodiments, a recipe step may be a specific set of instructions or actions that need to be carried out during a process recipe. For example, a deposition operation may be a recipe step that is included in a process recipe. In a deposition operation, a gas pressure parameter inside the processing chamber may transition from a first pressure to a second pressure before returning to the first temperature. Such a change in the gas pressure parameter of a recipe step (deposition operation) includes transitions (e.g., gas pressure parameter changing from a first pressure to a second pressure and back to the first pressure). In some embodiments, such signal traces depicting transitions and/or steps are used to generate an image that also depicts the transition and/or step.

In some embodiments, manufacturing equipment 124 includes sensors 126 that are configured to generate data associated with a processing chamber and/or a tool of manufacturing system 100. For example, a processing chamber can include one or more sensors configured to generate temperature data, pressure data, flow data, humidity data, optical data, vibration data, plasma data, position data, load data, gas concentration data, accelerometer data, strain gauge data, capacitance data, proximity data, magnetic data, pH data, conductivity data, resistivity data, particle data, and/or the like associated with the processing chamber before, during, and/or after a process (e.g., a deposition process). In some embodiments, spectral data generated by sensors 126 can indicate a concentration of one or more materials deposited on a surface of a substrate. Sensors 126 configured to generate spectral data associated with a substrate can include reflectometry sensors, ellipsometry sensors, thermal spectra sensors, capacitive sensors, and so forth. Sensors 126 configured to generate non-spectral data associated with a substrate can include residual thickness sensors, temperature sensors, pressure sensors, flow rate sensors, voltage sensors, etc.

Metrology equipment 128 can provide metrology data associated with substrates processed in and/or by processing chambers and/or tools of manufacturing equipment 124. The metrology data can include a wafer property data, dimensions (e.g., thickness, height, one or more critical dimensions, etc.), dielectric constant, dopant concentration, density, defects, etc. Metrology equipment 128 can provide metrology data associated with substrates processed by manufacturing equipment 124. In some embodiments, metrology data may be a subset of signal trace data 142 and/or defect data 152. The metrology data can include a wafer property data, dimensions (e.g., thickness, height, etc.), dielectric constant, dopant concentration, density, defects, etc. The metrology data can be of a finished or semi-finished product. The metrology data can be different for each substrate. Metrology data can be generated using, for example, reflectometry techniques, ellipsometry techniques, transmission electron microscopy (TEM) techniques, and so forth.

In some embodiments, the manufacturing equipment 124 (e.g., deposition chamber, cluster tool, wafer backgrind systems, wafer saw equipment, die attach machines, wirebonders, die overcoat systems, molding equipment, hermetic sealing equipment, metal can welders, deflash/trim/form/ singulation (DTFS) machines, branding equipment, lead finish equipment, and/or the like) is part of a substrate processing system (e.g., integrated processing system). The manufacturing equipment 124 includes one or more of a controller, an enclosure system (e.g., substrate carrier, front opening unified pod (FOUP), autoteach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. In some embodiments, the manufacturing equipment 124 includes components of substrate processing systems. In some embodiments, the signal trace data 142 of a processing chamber and/or a tool results from the processing chamber and/or tool undergoing one or more processes performed by components of the manufacturing equipment 124 (e.g., deposition, etching, heating, cooling, transferring, processing, flowing, etc.).

In some embodiments, the sensors 126 provide signal trace data 142 (e.g., sensor values, such as historical sensor values and current sensor values) of the processing chamber and/or tool of manufacturing equipment 124.

In some embodiments, the sensors 126 may include a metrology tool such as ellipsometers, ion mills, capacitance versus voltage (C-V) systems, interferometers, source measure units (SME) magnetometers, optical and imaging systems, profilometers, wafer probers, imaging stations, critical-dimension scanning electron microscope (, reflectometers, resistance probes, resistance high-energy electron diffraction (RHEED) system, X-ray diffractometers, and/or the like.

In some embodiments, the client device 120 includes a computing device such as Personal Computers (PCs), laptops, mobile phones, smart phones, tablet computers, netbook computers, etc. In some embodiments, the client device 120 includes a defect classification component 122, and a defect classification component 123. In some embodiments, the defect classification component 122, and/or the defect classification component 123 may also be included in the predictive system 110 (e.g., machine learning processing system). In some embodiments, the defect classification component 122, and/or defect classification component 123 are alternatively included in the predictive system 110 (e.g., instead of being included in client device 120). Client device 120 includes an operating system that can allow users to consolidate, generate, view, or edit data, provide directives to the predictive system 110 (e.g., machine learning processing system), etc.

In some embodiments, defect classification component 122, and/or defect classification component 123 receive one or more of user input (e.g., via a graphical user Interface (GUI) displayed on the client device 120), signal trace data 142, defect data 152, etc. In some embodiments, signal trace data 142 may be a time-series representation of a signal (e.g., of a sensor) that shows the values of the signal over time. In some embodiments, signal trace data may include sampled data points with timestamps and corresponding amplitudes. In some embodiments, signal trace data 142 may be sensor data (e.g., data collected by sensors 126), image data (e.g., images generated from signal traces), metrology data (e.g., data collected by metrology equipment 128), etc. In some embodiments, signal trace data 142 may include an ID of a particular signal trace (e.g., a signal trace ID of a signal trace corresponding to a row or column of an image where a defect was detected). In some embodiments, defect data 152 may be data that indicates detection of a defect (e.g., in a row or column of an image generated from signal traces), data that indicates a classification of a defect (e.g., a pressure defect), etc. In some embodiments, defect classification component 122 transmits data (e.g., user input, signal trace data 142, defect data 152, etc.) to the predictive system 110, receives predictive data 160 from the predictive system 110, and detects a defect based on the predictive data 160. In some embodiments, defect classification component 123 transmits data (e.g., user input, signal trace data 142, defect data 152, etc.) to the predictive system 110, receives predictive data 160 from the predictive system 110, and classifies a defect based on the predictive data 160. In some embodiments, the defect classification component 122, and/or defect classification component 123 store data (e.g., user input, signal trace data 142, defect data 152, etc.) in the data store 140 and the predictive server 112 retrieves the data from the data store 140. In some embodiments, the predictive server 112 stores output (e.g., predictive data 160) of the trained machine learning model 190 in the data store 140 and the client device 120 retrieves the output from the data store 140. In some embodiments, the defect classification component 122 receives an indication of a detected defect (e.g., based on predictive data 160) from the predictive system 110. In some embodiments, the defect classification component 123 receives an indication of a classified defect (e.g., based on predictive data 160) from the predictive system 110.

In some embodiments, the predictive server 112, server machine 170, and server machine 180 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 112 can include a predictive component 114. In some embodiments, the predictive component 114 identifies (e.g., receive from the client device 120, retrieve from the data store 140) signal trace data 142 (e.g., images generated from signal traces, signal trace IDs of signal traces corresponding to a row or column of an image where a defect was detected, data collected by sensors, etc.) and generates predictive data 160 associated with detecting a defect and/or classifying a defect. In some embodiments, the predictive component 114 uses one or more trained machine learning models 190 to determine the predictive data 160. In some embodiments, trained machine learning model 190 is trained using historical signal trace data 144 (e.g., historical image data, historical signal trace ID data) and historical defect data 154 (e.g., historical defect detection data, historical defect class data).

In some embodiments, detecting a defect includes identifying deviations from expected or desired performance parameters or characteristics. For example, if a temperature parameter of a manufacturing operation as measured by a sensor is expected to increase but does not, a defect may be detected.

In some embodiments, classifying a defect includes assigning the defect to a particular category or type based on, for example, the signal trace ID of a signal trace corresponding to a row or column of an image where a defect was detected. For example, if a signal trace ID indicates that the sensor where the signal trace corresponding to a row or column of an image where a defect was detected was a pressure sensor then the defect may be classified as a pressure defect.

In some embodiments, the predictive system 110 (e.g., predictive server 112, predictive component 114) generates predictive data 160 using supervised machine learning (e.g., supervised data set, historical signal trace data 144 labeled with historical defect data 154, etc.). In some embodiments, the predictive system 110 generates predictive data 160 using semi-supervised learning (e.g., semi-supervised data set, defect data 152 is a predictive percentage, etc.). In some embodiments, the predictive system 110 generates predictive data 160 using unsupervised machine learning (e.g., unsupervised data set, clustering, clustering based on historical signal trace data 144, etc.).

In some embodiments, the sensors 126 provide signal trace data 142 (e.g., sensor values, such as historical sensor values and current sensor values) of the processing chamber and/or tool of manufacturing equipment 124.

In some embodiments, the signal trace data 142 is used for fault analysis, tool and/or processing chamber fingerprinting, and tool and/or processing chamber matching. In some embodiments, the signal trace data 142 is received over a period of time.

In some embodiments, the signal trace data 142 (e.g., historical signal trace data 144, current signal trace data 146, etc.) is processed (e.g., by the client device 120 and/or by the predictive server 112). In some embodiments, processing of the signal trace data 142 includes generating features. In some embodiments, the features are a pattern in the signal trace data 142 (e.g., slope, width, height, peak, etc.) or a combination of values from the signal trace data 142 (e.g., power derived from voltage and current, etc.). In some embodiments, the signal trace data 142 includes features that are used by the predictive component 114 for obtaining predictive data 160.

In some embodiments, sensors 126 and/or metrology equipment 128 can be included as part of the manufacturing equipment 124. For example, sensors 126 and/or metrology equipment 128 can be included inside of or coupled to a processing chamber and configured to generate sensor and/or metrology data for the interior of a processing chamber or a substrate before, during, and/or after a process (e.g., a deposition process, an etch process, etc.) while the substrate remains in the processing chamber. In some instances, sensors 126 and/or metrology equipment 128 can be referred to as in-situ sensors and/or metrology equipment 128. In another example, sensors 126 and/or metrology equipment 128 can be coupled to another station of manufacturing equipment 124. For example, sensors 126 and/or metrology equipment 128 can be coupled to a transfer chamber, a load lock, or a factory interface.

In some embodiments, defect data 152 includes user input via client device 120. Signal trace data 142 may include sensor data from a first subset of the sensors 126 and defect data 152 may include sensor data from a second subset of the sensors 126.

In some embodiments, defect data 152 may be associated with a detection of a defect (e.g., a defective and/or anomalous sensor) and/or classification of a defect (e.g., classifying a defect as radio frequency (RF) power defect due to unexpected RF power levels measured as a signal trace by at least one of sensors 126). For example, defect data 152 may be of processing chambers and/or tools that have undergone a recipe and/or the processing operations (e.g., recipe steps) of the recipe.

In some embodiments, detecting a defect, for example, based on image data (e.g., signal trace data 142) and may be done using machine learning model (e.g., machine learning model 190). In some embodiments, classifying a defect, for example, may be based on the signal trace (as identified by a signal trace ID) corresponding to a row or column of the image where the defect was detected. In some embodiments, classifying the defect may be done using a machine learning model (e.g., machine learning model 190). In some embodiments, a signal trace ID is a unique identifier or label that identifies the signal trace. For example, in a semiconductor manufacturing system, there may be ten sensors each having a sensor ID (e.g., sensor 1, sensor 2, sensor 3, etc.). In some embodiments, a signal trace corresponding to a sensor is given a signal trace ID that matches the sensor ID (e.g., signal trace 1, signal trace 2, signal trace 3, etc.) In some embodiments, detecting a defect and/or classifying a defect includes providing machine learning based on the predictive data 160).

In some embodiments, the predictive data 160 is associated with detecting a defect in a row or column of an image and/or classifying a defect (e.g., detected in the row or column of an image). In some embodiments, detecting a defect is associated with one or more of training a machine learning model using data input comprising historical sensor values (e.g., signal trace data, image data, etc.) and target output comprising historical defect data (e.g., defect detection data, an indication of an anomaly detected in a row or column of the image, etc.), using a trained machine learning model to receive output associated with predictive data. In some embodiments, detecting a defect in a row or column of an image and/or classifying a defect is associated with one or more of training a machine learning model using data input comprising historical signal trace IDs (e.g., signal trace data, sensor IDs, signal trace ID data, etc.) and target output comprising historical defect data (e.g., defect classification data, an indication of a type of defect detected in a row or column of the image, etc.), using a trained machine learning model to receive output associated with predictive data.

In some embodiments, the data store 140 stores one or more of signal trace data 142, defect data 152, and/or predictive data 160. In some embodiments, data store 140 can be configured to store data that is not accessible to a user of the manufacturing system. For example, signal trace data, defect data, process data, contextual data, etc. obtained for a processing chamber and/or tool of the manufacturing system is not accessible to a user (e.g., an operator) of the manufacturing system. In some embodiments, all data stored at data store 140 can be inaccessible by the user of the manufacturing system. In some embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In some embodiments, data store 140 can include multiple data stores where data that is inaccessible to the user is stored in one or more first data stores and data that is accessible to the user is stored in one or more second data stores.

Signal trace data 142 may include historical signal trace data 144 and current signal trace data 146. In some embodiments, signal trace data 142 may include sensor values, sensor values converted into traces (e.g., signal traces), pressure data, temperature data, temperature range, power data, cooling rate data, cooling rate range, and/or the like. In some embodiments, at least a portion of the signal trace data 142 is from sensors 126.

Defect data 152 may include historical defect data 154 and current defect data 156. Defect data 152 may be indicative of whether a defect is present in a system (e.g., manufacturing system, substrate manufacturing system, etc.) is, whether a sensor (e.g., sensors 126) is properly functioning, whether a component of a manufacturing system or manufacturing equipment is defective (e.g., broken gas pump), etc. Defect data 152 may be indicative of whether a substrate manufacturing system is properly functioning. For example, defect data 152 may be indicative of a defective and/or mis-calibrated sensor in a processing chamber. Defect data 152 may also be indicative of malfunctioning components of a semiconductor manufacturing system (e.g., a broken heating element).

In some embodiments, historical data includes one or more of historical signal trace data 144 and/or historical defect data 154 (e.g., at least a portion for training the machine learning model 190). Current data may include one or more of current signal trace data 146 and/or current defect data 156 (e.g., at least a portion to be input into the trained machine learning model 190 subsequent to training the model 190 using the historical data). In some embodiments, the current data is used for retraining the trained machine learning model 190.

In some embodiments, the predictive data 160 is to be used to detect defects in manufacturing equipment 124, and/or classify defects in manufacturing equipment 124.

By providing signal trace data 142 to model 190 and receiving predictive data 160 from the model 190, system 100 has the technical advantage of avoiding the lack of sensitivity and lack of precise analysis of conventional methods.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test a machine learning model(s) 190. The data set generator 172 has functions of data gathering, compilation, reduction, and/or partitioning to put the data in a form for machine learning. In some embodiments (e.g., for small datasets), partitioning (e.g., explicit partitioning) for post-training validation is not used. Repeated cross-validation (e.g., 5-fold cross-validation, leave-one-out-cross-validation) may be used during training where a given dataset is in-effect repeatedly partitioned into different training and validation sets during training. A model (e.g., the best model, the model with the highest accuracy, etc.) is chosen from vectors of models over automatically separated combinatoric subsets. In some embodiments, the data set generator 172 may explicitly partition the historical data (e.g., historical signal trace data 144 and corresponding historical defect data 154) into a training set (e.g., sixty percent of the historical data), a validating set (e.g., twenty percent of the historical data), and a testing set (e.g., twenty percent of the historical data). Some operations of data set generator 172 are described in detail below with respect to FIG. 2 according to some embodiments. In some embodiments, the predictive system 110 (e.g., via predictive component 114) generates multiple sets of features (e.g., training features). In some examples a first set of features corresponds to a first set of types of signal trace data (e.g., from a first set of sensors, first combination of values from first set of sensors, first patterns in the values from the first set of sensors) that correspond to each of the data sets (e.g., training set, validation set, and testing set) and a second set of features correspond to a second set of types of signal trace data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. In some embodiments, an engine (e.g., training engine 182, a validation engine 184, selection engine 185, and a testing engine 186) refers to hardware (e.g., circuitry, dedicated logic, programmable logic, microcode, processing device, etc.), software (such as instructions run on a processing device, a general-purpose computer system, or a dedicated machine), firmware, microcode, or a combination thereof. The training engine 182 is capable of training a machine learning model 190 using one or more sets of features associated with the training set from data set generator 172. In some embodiments, the training engine 182 generates multiple trained machine learning models 190, where each trained machine learning model 190 corresponds to a distinct set of parameters of the training set (e.g., signal trace data 142) and corresponding responses (e.g., defect data 152). In some embodiments, multiple models are trained on the same parameters with distinct targets for the purpose of modeling multiple effects. In some examples, a first trained machine learning model was trained using signal trace data 142 from all sensors 126 (e.g., sensors 1-5), a second trained machine learning model was trained using a first subset of the property data (e.g., from sensors 1, 2, and 4), and a third trained machine learning model was trained using a second subset of the property data (e.g., from sensors 1, 3, 4, and 5) that partially overlaps the first subset of features.

The validation engine 184 is capable of validating a trained machine learning model 190 using a corresponding set of features of the validation set from data set generator 172. For example, a first trained machine learning model 190 that was trained using a first set of features of the training set is validated using the first set of features of the validation set. The validation engine 184 determines an accuracy of each of the trained machine learning models 190 based on the corresponding sets of features of the validation set. The validation engine 184 evaluates and flags (e.g., to be discarded) trained machine learning models 190 that have an accuracy that does not meet a threshold accuracy. In some embodiments, the selection engine 185 is capable of selecting one or more trained machine learning models 190 that have an accuracy that meets a threshold accuracy. In some embodiments, the selection engine 185 is capable of selecting the trained machine learning model 190 that has the highest accuracy of the trained machine learning models 190.

The testing engine 186 is capable of testing a trained machine learning model 190 using a corresponding set of features of a testing set from data set generator 172. For example, a first trained machine learning model 190 that was trained using a first set of features of the training set is tested using the first set of features of the testing set. The testing engine 186 determines a trained machine learning model 190 that has the highest accuracy of all of the trained machine learning models based on the testing sets.

In some embodiments, the machine learning model 190 (e.g., used for classification) refers to the model artifact that is created by the training engine 182 using a training set that includes data inputs and corresponding target outputs (e.g., correctly classifies a condition or ordinal level for respective training inputs). Patterns in the data sets can be found that map the data input to the target output (the correct classification or level), and the machine learning model 190 is provided mappings that captures these patterns. In some embodiments, the machine learning model 190 uses one or more of Gaussian Process Regression (GPR), Gaussian Process Classification (GPC), Bayesian Neural Networks, Neural Network Gaussian Processes, Deep Belief Network, Gaussian Mixture Model, or other Probabilistic Learning methods. Non probabilistic methods may also be used including one or more of Support Vector Machine (SVM), Radial Basis Function (RBF), clustering, Nearest Neighbor algorithm (k-NN), linear regression, random forest, neural network (e.g., artificial neural network), etc. In some embodiments, the machine learning model 190 is a multivariate analysis (MVA) regression model.

Predictive component 114 provides current signal trace data 146 (e.g., as input) to the trained machine learning model 190 and runs the trained machine learning model 190 (e.g., on the input to obtain one or more outputs). The predictive component 114 is capable of determining (e.g., extracting) predictive data 160 from the trained machine learning model 190 and determines (e.g., extracts) uncertainty data that indicates a level of credibility that the predictive data 160 corresponds to current defect data 156. In some embodiments, the predictive component 114 or defect classification component 122 use the uncertainty data (e.g., uncertainty function or acquisition function derived from uncertainty function) to decide whether to use the predictive data 160 to detect a defect or whether to further train the model 190. In some embodiments, the predictive component 114 or defect classification component 123 use the uncertainty data (e.g., uncertainty function or acquisition function derived from uncertainty function) to decide whether to use the predictive data 160 to classify a defect or whether to further train the model 190.

Figure 2:
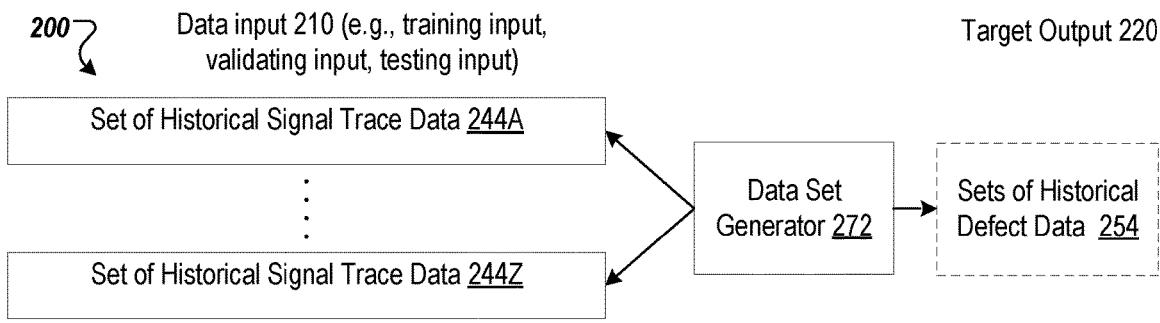
FIG. 2 illustrates a data set generator associated with image-based signal trace analysis, according to some embodiments.

For purpose of illustration, rather than limitation, aspects of the disclosure describe the training of one or more machine learning models 190 using historical data (e.g., prior data, historical signal trace data 144 and historical defect data 154) and providing current signal trace data 146 into the one or more trained probabilistic machine learning models 190 to determine predictive data 160. In other implementations, a heuristic model or rule-based model is used to determine predictive data 160 (e.g., without using a trained machine learning model). In other implementations non-probabilistic machine learning models may be used. Predictive component 114 monitors historical signal trace data 144 and historical defect data 154. In some embodiments, any of the information described with respect to data inputs 210 of FIG. 2 are monitored or otherwise used in the heuristic or rule-based model.

In some embodiments, the functions of client device 120, predictive server 112, server machine 170, and server machine 180 are to be provided by a fewer number of machines. For example, in some embodiments, server machines 170 and 180 are integrated into a single machine, while in some other embodiments, server machine 170, server machine 180, and predictive server 112 are integrated into a single machine. In some embodiments, client device 120 and predictive server 112 are integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 detects defects based on the predictive data 160. In another example, the predictive server 112 classifies defects based on the predictive data 160. In another example, client device 120 determines the predictive data 160 based on data received from the trained machine learning model.

In addition, the functions of a particular component can be performed by different or multiple components operating together. In some embodiments, one or more of the predictive server 112, server machine 170, or server machine 180 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of determining predictive data 160 for image-based signal trace analysis for a substrate manufacturing system, in some embodiments, the disclosure can also be generally applied to image-based signal trace analysis in any system and/or manufacturing facility.

FIG. 2 illustrates a data set generator 272 (e.g., data set generator 172 of FIG. 1) to create data sets for a machine learning model (e.g., associated with image-based signal trace analysis, methods 600A-D, etc.) (e.g., model 190 of FIG. 1), according to certain embodiments. In some embodiments, data set generator 272 is part of server machine 170 of FIG. 1. The data sets generated by data set generator 272 of FIG. 2 may be used to train a machine learning model (e.g., see FIG. 6B) to detect a defect (e.g., see FIG. 6C) and/or classification of a defect (e.g., see FIG. 6D).

Data set generator 272 creates data sets using historical signal trace data 244 (e.g., historical signal trace data 144 of FIG. 1) and historical performance data 254 (e.g., historical defect data 154 of FIG. 1). System 200 of FIG. 2 illustrates data set generator 272, data inputs 210, and target output 220 (e.g., target data).

In some embodiments, data set generator 272 generates a data set (e.g., training set, validating set, testing set) that includes one or more data inputs 210 (e.g., training input, validating input, testing input). In some embodiments, data set generator 272 does not generate target output (e.g., for unsupervised learning). In some embodiments, data set generator 272 generates one or more target outputs 220 (e.g., for supervised learning) that correspond to the data inputs 210. The data set may also include mapping data that maps the data inputs 210 to the target outputs 220. Data inputs 210 are also referred to as "features," "attributes," or information." In some embodiments, data set generator 272 provides the data set to the training engine 182, validation engine 184, or testing engine 186, where the data set is used to train, validate, or test the machine learning model 190 (e.g., associated with image-based signal trace analysis, methods 600A-D, etc.).

In some embodiments, data set generator 272 generates the data input 210 and target output 220. In some embodiments, data inputs 210 include one or more sets of historical signal trace data 244 (e.g., image data, sensor values, etc.) (e.g., associated with image-based signal trace analysis, methods 600A-D, etc.). In some embodiments, historical signal trace data 244 includes one or more of signal trace data from one or more types of sensors and/or metrology equipment, a combination of signal trace data from one or more types of sensors and/or metrology equipment, patterns from signal trace data from one or more types of sensors and/or metrology equipment, and/or the like.

In some embodiments, data set generator 272 generates a first data input corresponding to a first set of historical signal trace data 244A to train, validate, or test a first machine learning model and the data set generator 272 generates a second data input corresponding to a second set of historical signal trace data 244B to train, validate, or test a second machine learning model (e.g., associated with image-based signal trace analysis, methods 600A-D, etc.).

In some embodiments, the data set generator 272 discretizes (e.g., segments) one or more of the data input 210 or the target output 220 (e.g., to use in classification algorithms for regression problems). Discretization (e.g., segmentation via a sliding window) of the data input 210 or target output 220 transforms continuous values of variables into discrete values. In some embodiments, the discrete values for the data input 210 indicate discrete historical signal trace data 144 to obtain a target output 220 (e.g., discrete historical defect data 154).

Data inputs 210 and target outputs 220 to train, validate, or test a machine learning model include information for a particular facility (e.g., for a particular substrate manufacturing facility). In some examples, historical signal trace data 244 and historical performance data 254 are for the same manufacturing facility (e.g., associated with image-based signal trace analysis, methods 600A-D, etc.).

In some embodiments, the information used to train the machine learning model is from specific types of manufacturing equipment 124 of the manufacturing facility having specific characteristics and allow the trained machine learning model (e.g., associated with image-based signal trace analysis, methods 600A-D, etc.) to determine outcomes for a specific group of manufacturing equipment 124 based on input for current parameters (e.g., current signal trace data 146) associated with one or more components sharing characteristics of the specific group. In some embodiments, the information used to train the machine learning model is for components from two or more manufacturing facilities and allows the trained machine learning model to determine outcomes for components based on input from one manufacturing facility.

In some embodiments, subsequent to generating a data set and training, validating, or testing a machine learning model 190 using the data set, the machine learning model 190 (e.g., associated with image-based signal trace analysis, methods 600A-D, etc.) is further trained, validated, or tested (e.g., current defect data 156 of FIG. 1) or adjusted (e.g., adjusting weights associated with input data of the machine learning model 190, such as connection weights in a neural network).

The machine learning model processes the input to generate an output (e.g., associated with image-based signal trace analysis, methods 600A-D, etc.). An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer can be another hidden layer or an output layer. In either case, the nodes at the next layer receive the output values from the nodes at the previous layer, and each node applies weights to those values and then generates its own output value. This can be performed at each layer. A final layer is the output layer, where there is one node for each class, prediction and/or output that the machine learning model can produce.

Accordingly, the output can include one or more predictions or inferences (e.g., associated with image-based signal trace analysis, methods 600A-D, etc.). For example, an output prediction or inference can include one or more predictions of a detected defect, a defect classification, deposition drift, film buildup on chamber components, erosion of chamber components, predicted failure of chamber components, predicted failure of deposition operation, and so on. Processing logic determines an error (e.g., a classification error) based on the differences between the output (e.g., predictions or inferences) of the machine learning model and target labels associated with the input training data. Processing logic adjusts weights of one or more nodes in the machine learning model based on the error. An error term or delta can be determined for each node in the artificial neural network. Based on this error, the artificial neural network adjusts one or more of its parameters for one or more of its nodes (the weights for one or more inputs of a node). Parameters can be updated in a back propagation manner, such that nodes at a highest layer are updated first, followed by nodes at a next layer, and so on. An artificial neural network contains multiple layers of "neurons", where each layer receives input values from neurons at a previous layer. The parameters for each neuron include weights associated with the values that are received from each of the neurons at a previous layer. Accordingly, adjusting the parameters can include adjusting the weights assigned to each of the inputs for one or more neurons at one or more layers in the artificial neural network.

After one or more rounds of training, processing logic can determine whether a stopping criterion has been met. A stopping criterion can be a target level of accuracy, a target number of processed images from the training dataset, a target amount of change to parameters over one or more previous data points, a combination thereof and/or other criteria. In some embodiments, the stopping criterion is met when at least a minimum number of data points have been processed and at least a threshold accuracy is achieved. The threshold accuracy can be, for example, 70%, 80%, or 90% accuracy. In some embodiments, the stopping criterion is met if an accuracy of the machine learning model has stopped improving. If the stopping criterion has not been met, further training is performed. If the stopping criterion has been met, training can be completed. Once the machine learning model is trained, a reserved portion of the training dataset can be used to test the model.

Figure 3:
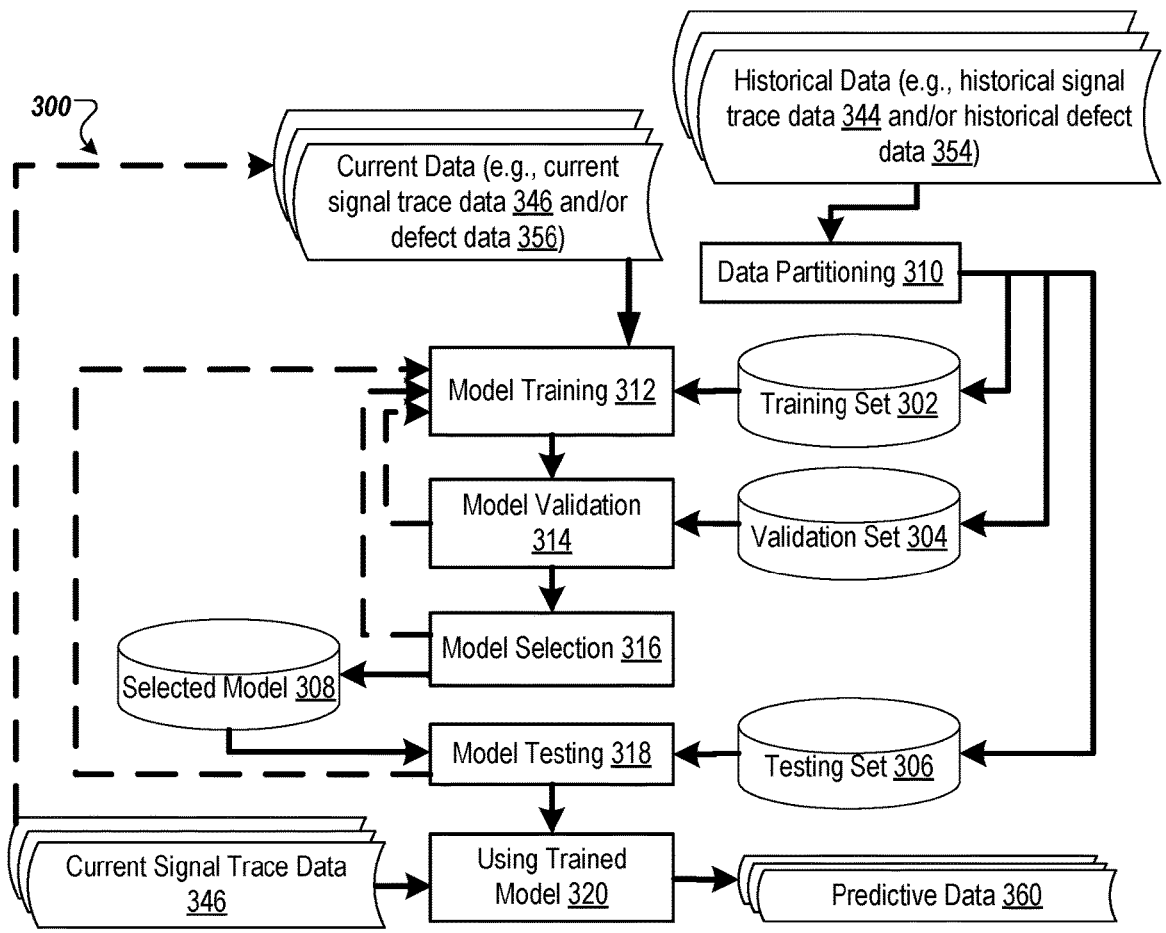
FIG. 3 is a block diagram illustrating a system to detect defects using image-based signal trace analysis, according to some embodiments.

FIG. 3 is a block diagram illustrating a system 300 for detecting defects using image-based signal trace analysis, according to certain embodiments. The system 300 can detect defects using a trained machine learning model (e.g., associated with image-based signal trace analysis, methods 600A-D, etc.) (e.g., model 190 of FIG. 1).

At block 310, the system 300 (e.g., predictive system 110 of FIG. 1) begins preparation of training data for the machine learning model by performing data partitioning (e.g., via data set generator 172 of server machine 170 of FIG. 1) of the historical data (e.g., historical signal trace data 344 and/or historical defect data 354 for model 190 of FIG. 1) to generate the training set 302, validation set 304, and testing set 306 (e.g., associated with image-based signal trace analysis, methods 600A-D, etc.). In some examples, the training set is 60% of the historical data, the validation set is 20% of the historical data, and the testing set is 20% of the historical data. The system 300 generates a plurality of sets of features for each of the training set, the validation set, and the testing set. In some examples, if the historical data includes features derived from 20 sensors (e.g., sensors 126 of FIG. 1, sensors of manufacturing equipment and/or metrology equipment) and 100 chambers and/or tools (e.g., chambers and/or tools that each correspond to signal trace data from the 20 sensors), a first set of features is sensors 1-10, a second set of features is sensors 11-20, the training set is products 1-60, the validation set is products 61-80, and the testing set is products 81-100. In this example, the first set of features of the training set would be parameters from sensors 1-10 for products 1-60.

At block 312, the system 300 performs model training (e.g., via training engine 182 of FIG. 1 associated with image-based signal trace analysis, methods 600A-D, etc.) using the training set 302. In some embodiments, the system 300 trains multiple models using multiple sets of features of the training set 302 (e.g., a first set of features of the training set 302, a second set of features of the training set 302, etc.). For example, system 300 trains a machine learning model to generate a first trained machine learning model using the first set of features in the training set (e.g., signal trace data from sensors 1-10 for products 1-60) and to generate a second trained machine learning model using the second set of features in the training set (e.g., signal trace data from sensors 11-20 for products 1-60). In some embodiments, the first trained machine learning model and the second trained machine learning model are combined to generate a third trained machine learning model (e.g., which is a better predictor than the first or the second trained machine learning model on its own in some embodiments). In some embodiments, sets of features are used in comparing models overlap (e.g., first set of features being signal trace data from sensors 1-15 and second set of features being signal trace data from sensors 5-20). In some embodiments, hundreds of models are generated including models with various permutations of features and combinations of models.

At block 314, the system 300 performs model validation (e.g., via validation engine 184 of FIG. 1) using the validation set 304. The system 300 validates each of the trained models (e.g., associated with image-based signal trace analysis, methods 600A-D, etc.) using a corresponding set of features of the validation set 304. For example, system 300 validates the first trained machine learning model using the first set of features in the validation set (e.g., parameters from sensors 1-10 for processing chambers and/or tools 61-80) and the second trained machine learning model using the second set of features in the validation set (e.g., parameters from sensors 11-20 for processing chambers and/or tools 61-80). In some embodiments, the system 300 validates hundreds of models (e.g., models with various permutations of features, combinations of models, etc.) generated at block 312. At block 314, the system 300 determines an accuracy of each of the one or more trained models (e.g., via model validation) and determines whether one or more of the trained models have an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 discards the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow returns to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 tests, using the first set of features in the testing set (e.g., signal trace data from sensors 1-10 for processing chambers and/or tools 81-100), the first trained machine learning model to determine whether the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features (e.g., signal trace data from different sensors). Responsive to determining that the selected model 308 has an accuracy that meets a threshold accuracy based on the testing set 306, flow continues to block 320. In at least block 312, the model learns patterns in the historical data to make predictions and in block 318, the system 300 applies the model on the remaining data (e.g., testing set 306) to test the predictions (e.g., associated with image-based signal trace analysis, methods 600A-D, etc.).

At block 320, system 300 uses the trained model (e.g., selected model 308) for defect detection/defect classification. System 300 provides current signal trace data 346 (e.g., current signal trace data 146 of FIG. 1) as input to the trained model and obtains, from the trained model, predictive data 360 (e.g., predictive data 160 of FIG. 1) that reflects image-based signal trace analysis, where the predictive data indicates defect detection data and/or defect classification data (e.g., detected defect, classification of a defect, etc.). In some embodiments, the current signal trace data 346 corresponds to the same types of features in the historical signal trace data 344. In some embodiments, the current signal trace data 346 corresponds to a same type of features as a subset of the types of features in historical signal trace data 344 that is used to train the selected model 308 (e.g., associated with image-based signal trace analysis, methods 600A-D, etc.). In some embodiment, the current signal trace data is represented in an image, as discussed in more detail herein.

In some embodiments, system 300 receives user input indicating accuracy of the predicted data, and this information together with the current predicted defect data 356 and the current signal trace data 346 is used to re-train the machine learning model.

In some embodiments, one or more of the blocks 310-320 occur in various orders and/or with other operations not presented and described herein. In some embodiments, one or more of blocks 310-320 are not to be performed. For example, in some embodiments, one or more of data partitioning of block 310, model validation of block 314, model selection of block 316, and/or model testing of block 318 are not to be performed.

Figure 4:
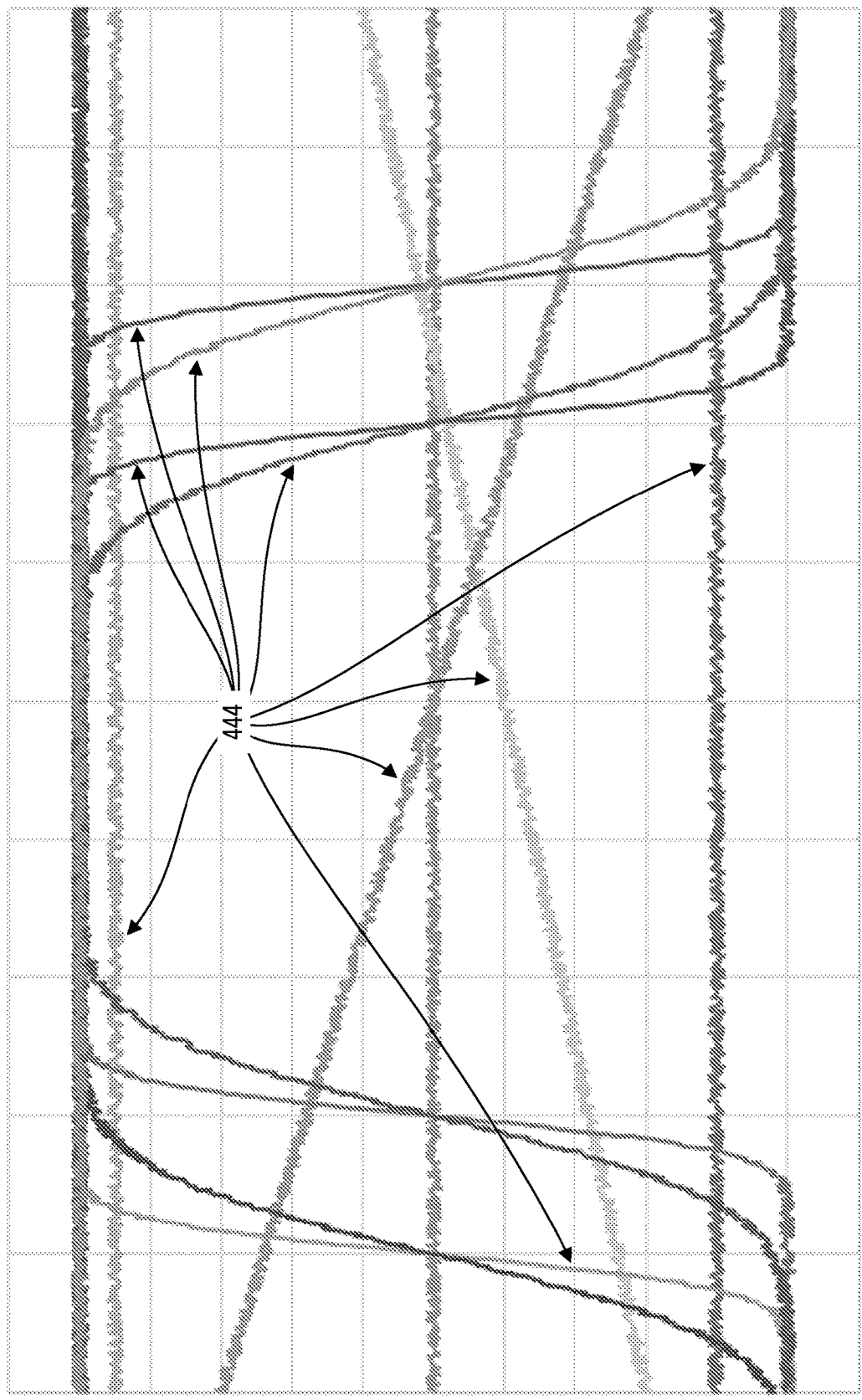
FIG. 4 is a waveform graph illustrating signal traces, according to some embodiments.

FIG. 4 is waveform graph illustrating signal traces, according to some embodiments.

In some embodiments, the x-axis of waveform graph 400A corresponds to time axis and the y-axis corresponds to the magnitude of the signal trace (e.g., corresponding to sensor values collected by a sensor corresponding each signal trace). In some embodiments, certain signal traces of signal traces 444 remain constant for the depicted duration. In some embodiments, certain signal traces of signal traces 444 decrease or increase linearly at a constant rate. In some embodiments, certain signal traces of signal traces 444 begin at a low magnitude, increase to a high magnitude, and remain high or return to a low magnitude. In some embodiments, certain signal traces of signal traces 444 begin at a high magnitude, increase to a low magnitude, and remain low or return to a high magnitude.

In some embodiments, sampling rates of multiple signal traces (e.g., signal traces 444) are changed (resampled) into a uniform time sequence to address sensor variations in sampling rates. For example, a temperature sensor may have a maximum sampling rate of 1 Hz and a pressure sensor may have a maximum sampling rate of 100 Hz. Signal traces collected by such sensors cannot be easily compared. Thus, resampling them to a uniform time sequence results in meaningful comparison. In some embodiments, sampling rates of signal traces 444 may be changed (resampled) to the fastest uniform time sequence of the signal traces 444. For example, in the previous example, the temperature sensor that was sampled at 1 Hz is resampled to the sampling rate (100 Hz) of the pressure sensor because 100 Hz is the fastest uniform time sequence. In some embodiments, interpolation (e.g., linear interpolation) may be used in the changing of a sampling rate of signal traces 444. In some embodiments, extrapolation may be used in the changing of a sampling rate of signal traces 444.

In some embodiments, multiple signal traces (e.g., signal traces 444) are normalized to a uniform scaling. In some embodiments, multiple sensors (e.g., sensors 126) collect signal traces of varying signal amplitudes and ranges. For example, a temperature sensor may have a range of -40 degrees Celsius to 125 degrees Celsius and a humidity sensor may have a range of 0% to 100% relative humidity. Signal traces collected by such sensors cannot be easily compared without first being normalized to a uniform scaling. Thus, normalizing signal traces 444 results in meaningful comparison results.

In some embodiments, signal traces 444 can be filtered and/or smoothed to address presence of noise in the signal traces. In some embodiments, any one of a low-pass filter, a moving average filter, a median filter, a Butterworth filter, a Savitzky-Golay filter, a wavelet transform, and/or the like maybe be applied to signal traces 444 for filtering and smoothing. In some embodiments, signal traces 444 can be processed by applying any appropriate filtering and/or smoothing technique to improve its quality.

Figure 5A:
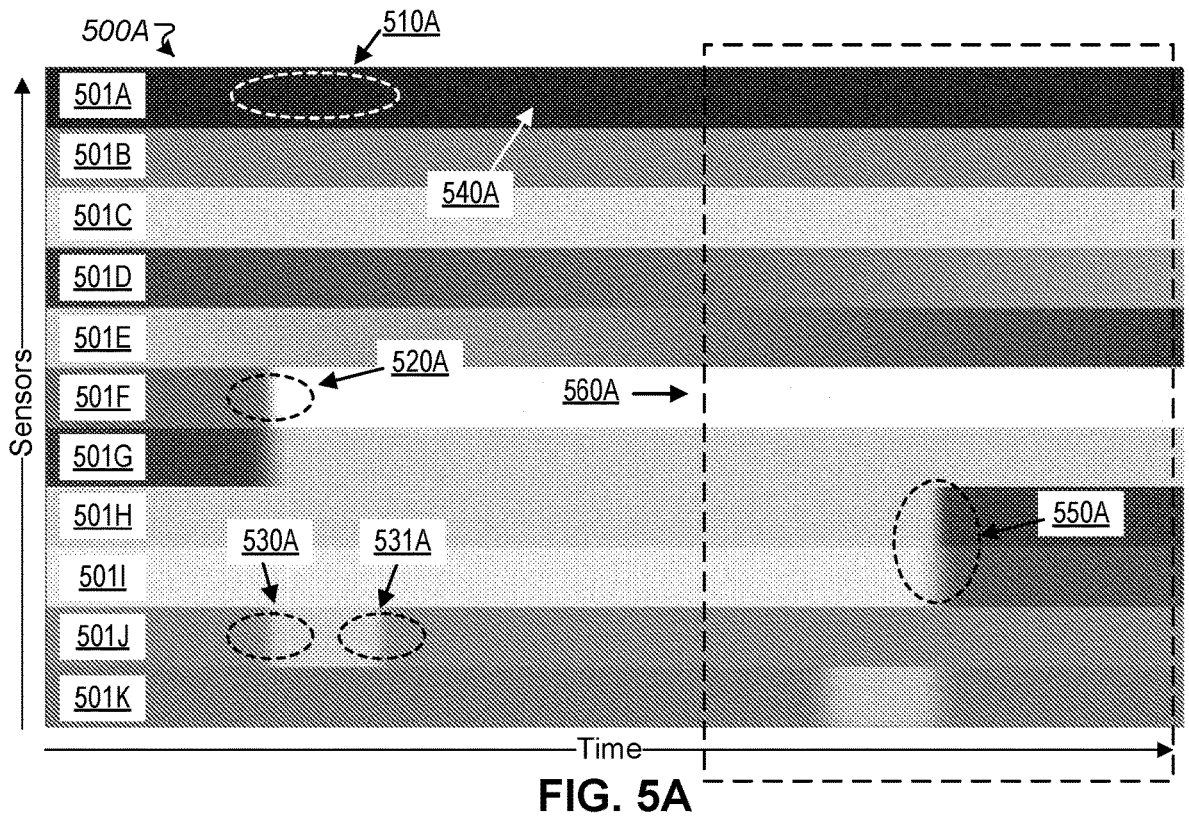
FIGS. 5A-B are images generated from signal traces, according to some embodiments.
Figure 5B:
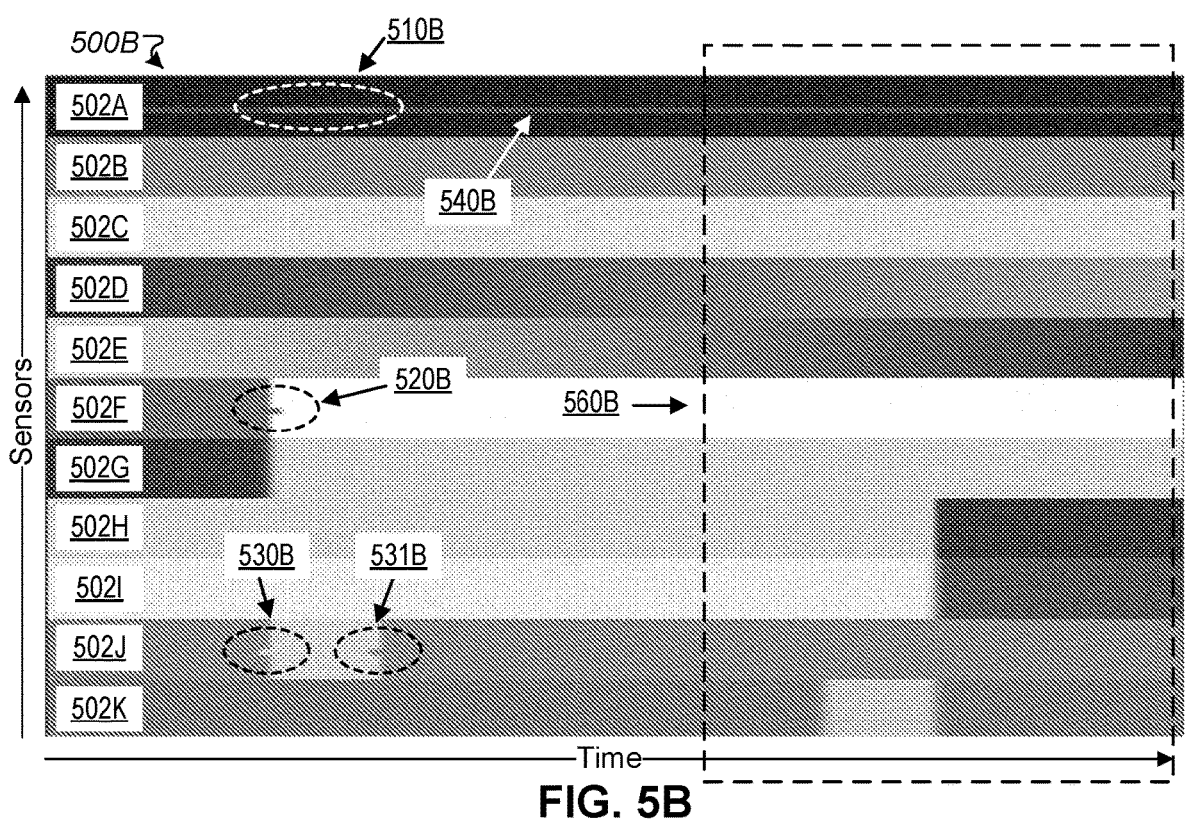

FIGS. 5A-B are images generated from signal traces, according to some embodiments.

In some embodiments, the y-axis (e.g., a first dimension) of images 500A and 500B (of FIGS. 5A and 5B) corresponds to signal traces and signal trace data (e.g., signal trace data 501A-K and signal trace data 502A-K) of sensors 126 of FIG. 1. In some embodiments, images 500A and 500B include groups (e.g., groups 501A-K and 501A-K) of visual indicators (e.g., a grey level) associated with signal traces with similar signal trace characteristics, where a first dimension (e.g., a rows) of the image corresponds to at least one of the plurality of signal traces, and a second dimension of the image corresponds to multiple time values. In some embodiments, a first visual indicator in the groups of visual indicators corresponds to a signal trace characteristic (e.g., a magnitude) of a first signal trace of the multiple signal traces at a first time value of the multiple time values. In some embodiments, the first signal trace corresponds to a first row or column with respect to the first dimension in the image, and the first time value corresponds to a first position with respect to the second dimension of the image.

In some embodiments, a time value may be a timestamp or index in time. For example, an index in time may be an index values that corresponds to a time value (e.g., index value 1 corresponds to zero seconds, index value 2 corresponds to five seconds, index value 3 corresponds to ten seconds, etc.)

In some embodiments, signal traces with similar signal trace characteristics may be matching signal trace characteristics. In some embodiments, signal traces with similar signal trace characteristics may be partially matching signal trace characteristics. For example, partially matching signal trace characteristics may be matching in time (e.g., share timing) but not be matching in amplitude of variation (e.g., where the difference in the amplitude of variation does not exceed a threshold).

In some embodiments, signal traces with similar signal trace characteristics may be signal traces of a similar type. For example, a first signal trace and a second signal trace may be similar in type because the first signal trace corresponds to a first temperature sensor within a processing chamber and the second signal trace corresponds to a second temperature sensor within the processing chamber.

In some embodiments, signal traces with similar signal trace characteristics may be signal traces with similar timing. For example, a first signal trace may correspond to a first sensor and a second signal trace may correspond to a second sensor. The first sensor tracking a first manufacturing component that generates a low reading at the same time as a second manufacturing component tracked by the second sensor.

In some embodiments, signal traces with similar signal trace characteristics may be signal traces of a similar rate of change. For example, a first signal trace and a second signal trace may have rates of change that are similar because both the first and second signal traces correspond to sensors tracking components with similar behavior (e.g., rates of changes). In some embodiments, signal traces with similar signal trace characteristics may be signal traces of a similar strength of change. For example, a first signal trace and a second signal trace may have a similar amplitude of variation or magnitude of change.

In some embodiments, signal traces with similar signal trace characteristics may be signal traces with matching signal trace characteristics. In some embodiments, matching signal trace characteristics may be signal trace characteristics that are identical or nearly identical.

In some embodiments, the x-axis (e.g., a second dimension) of images 500A and 500B corresponds to an index, time index and/or time values. In some embodiments, images 500A and 500B are generated from signal traces, where each row of images 500A and 500B corresponds to a signal trace. In some embodiments, a visual indicator may be a color or color intensity of a pixel corresponding to a characteristic of a signal trace at a point in time (e.g., time value, timestamp, index in time, etc.). In some embodiments, the groups of visual indicators may be combined based on a similar color intensity (e.g., an intensity level of grey color, grey scale, etc.). In some embodiments, a higher grey level may correspond to a higher signal trace magnitude and a lower grey level may correspond to a lower signal trace value.

In some embodiments, a time value may be a timestamp or index in time. For example, an index in time may be an index value that corresponds to a time value (e.g., index value 1 corresponds to zero seconds, index value 2 corresponds to five seconds, index value 3 corresponds to ten seconds, etc.)

In some embodiments, a row of image 500A and/or 500B corresponding to a signal trace may be repeated (e.g., same row appears, for example, five successive times) in order to increase a weight of the signal trace. In some embodiments, weighting of rows corresponding to signal traces may be performed on all rows or columns of the image. In some embodiments, repeating each row (or column) of the image may cause defects to appear as larger sections (portions) of the image making them more easily detectable. In some embodiments, such weighting of rows or columns corresponding to signal traces may be performed on select rows or columns (e.g., for signal traces corresponding to important and/or critical sensors). In some embodiments, every row in images 500A and 500B may be repeated a certain number of times (e.g., five times) and selected rows (e.g., corresponding to important/critical sensors) may further be repeated a certain number of times (e.g., ten times) to increase sensitivity for the selected rows.

In some embodiments, images 500A and 500B are at least one of 8-bit, 12-bit, or 16-bit grey scale. In some embodiments, any other number of bits may be used depending on the desired dynamic range. In some embodiments, the groups of visual indicators may be grey levels of pixels associated with signal traces with similar signal trace characteristics. In some embodiments, a first dimension of the image may correspond to at least one of the plurality of signal traces and a second dimension of the image corresponds to a plurality of time values. In some embodiments, a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image. In some embodiments, a dark grey color corresponds to a low magnitude of the signal trace represented by the row or column (e.g., a low measured value collected by the sensor corresponding to the signal trace represented by the row or column). In some embodiments, a light grey color corresponds to a high magnitude of the signal trace represented by the row or column (e.g., a low measured value collected by the sensor corresponding to the signal trace represented by the row or column). In some embodiments, a gradual transition (e.g., from dark to light or light to dark) corresponds to a gradual increase or decrease in the magnitude of the signal trace represented by the row or column (e.g., a gradual increase or decrease in the measured value collected by the sensor corresponding to the signal trace represented by the row or column). In some embodiments, a rapid transition (e.g., from dark to light or light to dark) corresponds to a rapid increase or decrease in the magnitude of the signal trace represented by the row or column (e.g., a rapid increase or decrease in the measured value collected by the sensor corresponding to the signal trace represented by the row or column).

In some embodiments, a fuzzy transition edge (as compared to a sharp edge) depicts a different rate of change. In some embodiments, a sharp edge depicts a faster rate of change and a fuzzy (e.g., blurred edge) depicts a slower rate of change. For example, a first signal trace may change from a low value to a high value in ten time indexes and the change may be depicted by a sharp edge. A second signal trace may change from the low value to the high value in twenty time indexes and the change may be depicted by a fuzzy edge. The second signal trace represents slower rate of change (twice as slow) than the first signal trace.

In some embodiments, similarly-behaved signals (e.g., signals that follow similar curves) are grouped together (e.g., are in adjacent rows or columns). In some embodiments, arranging the multiple signal traces includes arranging the rows or columns corresponding to the plurality of signal traces. In some embodiments, arranging the multiple signal traces includes arranging the visual indicators of the image corresponding to each of the plurality of signal trace. For example, in a manufacturing system there may be multiple processing chambers each having a temperature sensor. For a given recipe the temperature sensor values in each of the processing chambers should be the same and the rows or columns corresponding to each of the temperature sensors could be grouped together based on the similar signal trace characteristics of the temperature sensor signal traces.

In another example, a temperature sensor and a pressure sensor may be grouped to together because an increase in temperate corresponds to an increase in pressure. In another example, 10 different temperature sensors are on a chuck that is to be heated to a uniform temperature and the temperature sensors may be grouped together based on the signal trace characteristics of the temperature sensors. In some embodiments, if one of the heating elements has a defect and the chuck does not heat evenly the discrepancy will be readily visible due to the contrast between the rest of the similarly behaved signals (e.g., with similar signal trace characteristics) grouped with the trace signal of the temperature sensor near the defective heating element which has deviated from the group. In some embodiments, such grouping enables easier detection of a defect in operation of the manufacturing equipment and/or a sensor that is defective (e.g., based on a deviation from one of the visual indicators in at least one row or column of the image from a visual indicator of a respective group).

In some embodiments, by identifying a row or column with a deviation of one of the visual indicators in at least one portion of at least one row or column of the image from a visual indicator of a respective group the signal trace corresponding to the row or column and/or sensor corresponding to the signal trace may be identified as defective. In some embodiments, at least one of the one or more components of the manufacturing equipment may have a defect in operation when a row or column with a deviation of one of the visual indicators in at least one portion of at least one row or column of the image from a visual indicator of a respective group is detected.

In some embodiments, the visual indicator of the respective group may be a visual indicator of a respective group of a reference image. In some embodiments, a reference image may correspond to signal traces from an exemplary tool (e.g., a tool that is calibrated) and/or an exemplary run of a process or operation on the tool.

In some embodiments, a recipe or recipe step may last for a predetermined amount of time. In some embodiments, sensors (e.g., sensors 126) collect signal traces for the duration of the recipe or recipe step. The collected signal traces are then used to generate an image (e.g., images 500A and 500B) that represents the length of the recipe or recipe step. In some embodiments, the image is segmented (e.g., cut) along an axis (e.g., x-axis, y-axis, axis corresponding to time values, etc.) into shorter images depicting a fraction (e.g., a portion) of the duration of the recipe or recipe step. For example, images 500A and 500B may be segmented into segments 560A and 560B, respectively. In some embodiments, the segmenting is based on capturing at least one signal trace transition and/or recipe step in a segmented image. In some embodiments, this is because defects may be more prevalent during such transitions and/or recipe steps. For example, segment 560A captures point 550A (depicting transitions in groups 501H and 501I).

In some embodiments, images 500A and 500B may show the same time segmented portion of a recipe step performed, for example, in the same chamber at different times. In some embodiments, segment 560A and 560B may show the same time segmented portion of a recipe step performed, for example, in the same chamber at different times.

In FIG. 5A, group 501A corresponds to a group of signal traces that have a constant low magnitude. Point 510A contains no defects.

Group 501B corresponds to a group of signal traces that have a constant intermediate magnitude.

Group 501C corresponds to a group of signal traces that have a constant high magnitude.

Group 501D corresponds to a group of signal traces that begin with a low magnitude and increase linearly to an intermediate magnitude.

Group 501E corresponds to a group of signal traces that begin with a high magnitude and decrease linearly to a low magnitude.

Group 501F corresponds to a group of signal traces that begin with an intermediate magnitude and increase at point 520A to a high magnitude. Point 520A depicts a rapid transition (e.g., by showing a relatively sharp edge for the transition).

Group 501G corresponds to a group of signal traces that begin with a low magnitude and increase to an intermediate magnitude.

Group 501H corresponds to a group of signal traces that begin with a high magnitude and decrease to a low magnitude.

Group 501I corresponds to a group of signal traces that begin with a high magnitude and decrease to a low magnitude. In some embodiments, point 550A depicts transitions in groups 501H and 501I. It may be noted that the transition edge in group 501H is sharper than the transition edge in group 501I. In some embodiments, such a distinction correlates to a faster transition in group 501H.

Group 501J corresponds to a group of signal traces that start at an intermediate magnitude, increase at point 530A to a high magnitude, and decrease back to an intermediate magnitude at point 531A.

Group 501K corresponds to a group of signal traces that start at an intermediate magnitude, increase exponentially to a high magnitude, and decrease exponentially back to an intermediate magnitude. It may be noted the signal trace transition edges in group 501J are sharper than the signal trace transition edges in group 501K (e.g., showing that the transitions are faster in group 501J than in group 501K).

In FIG. 5B, a new (current) set of signal traces is represented (e.g., in groups 502A-K). In some embodiments, image 500B is generated from signal traces derived from the same sensors as image 500A, but the signal traces correspond to a later run of the same operation. Image 500A may illustrate a normal behavior of the system and be used as a reference image to detect deviations in subsequent behavior illustrated by subsequent images. For example, as time passes, components of manufacturing equipment or a manufacturing system may become defective and/or mis-calibrated causing defects to appear in an image generated from signal traces corresponding to an operation completed after such defects and/or miscalibration arise. In other embodiments, image 500B is generated from signal traces derived from sensors similar to the sensors used to generate image 500A, but the signal traces of image 500B correspond to sensors in an identical processing chamber running the same recipe and/or processing operations.

Group 502A corresponds to a group of signal traces that in image 500A of FIG. 5A had a constant low magnitude. In image 500B, row 540B shows a signal trace corresponding to a defective sensor or a defect in the operation of a component of the manufacturing equipment. In the case where there is no defect the visual indicators of row 540B associated with the corresponding signal trace should match the visual indicators of row 540A associated with the corresponding signal trace. As depicted in image 500A of FIG. 5A, row 540B should be a constant magnitude matching the magnitude (grey scale) of the rest of the signal traces in group 502A. However, image 500B shows a deviation (e.g., defect) in row 540B from group 502A where row 540B is a different color than the rest of the rows in group 502A (e.g., visual indicators of 540B show a different magnitude than the rest of the visual indicators of signal traces represented in group 502A).

Further, at point 510B the magnitude of the signal trace corresponding to row 540B increases and then decreases as shown by a change in the greyscale of row 540B. In some embodiments, detecting a defect in operation of at least one of the one or more components of the manufacturing equipment based on a deviation of one of the visual indicators in at least one portion of at least one row or column of the image from a visual indicator of a respective group. In some embodiments, the visual indicator of the respective group may be a visual indicator of a respective group of a reference image. In some embodiments, a reference image may correspond to signal traces from an exemplary tool (e.g., a tool that is calibrated) and/or an exemplary run of a process or operation on the tool. In some embodiments, detecting a deviation of one of the visual indicators in at least one portion of at least one row or column of the image from a visual indicator of a respective group may be done using machine learning processes.

Group 502B corresponds to a group of signal traces that in image 500A of FIG. 5A had a constant intermediate magnitude. No defects are present in group 502B of image 500B.

Group 502C corresponds to a group of signal traces that in image 500A of FIG. 5A had a constant high magnitude. No defects are present in group 502C of image 500B.

Group 502D corresponds to a group of signal traces that in image 500A of FIG. 5A began with a low magnitude and increased linearly to an intermediate magnitude. No defects are present in group 502D of image 500B.

Group 502E corresponds to a group of signal traces that in image 500A of FIG. 5A began with a high magnitude and decreased linearly to a low magnitude. No defects are present in group 502E of image 500B.

Group 502F corresponds to a group of signal traces that in image 500A of FIG. 5A began with an intermediate magnitude and increased at point 520B to high magnitude. In image 500B a defect is present in a row of group 502F at point 520B. Point 520B depicts a rapid transition (e.g., by showing a relatively sharp edge for the transition), however one row of group 502F was delayed. Such a defect may be due to a timing defect, faulty sensor, faulty component of manufacturing equipment, etc.

Group 502G corresponds to a group of signal traces that in image 500A of FIG. 5A began with a low magnitude and increased to an intermediate magnitude. No defects are present in group 502G of image 500B.

Group 502H corresponds to a group of signal traces that in image 500A of FIG. 5A began with a high magnitude and decreased to a low magnitude. No defects are present in group 502H of image 500B.

Group 502I corresponds to a group of signal traces that in image 500A of FIG. 5A began with a high magnitude and decreased to a low magnitude. No defects are present in group 502I of image 500B.

Group 502J corresponds to a group of signal traces that in image 500A of FIG. 5A began at an intermediate magnitude, increased at point 530B to a high magnitude, and decreased back to an intermediate magnitude at point 531B. In image 500B two defects (e.g., in operation of at least one of the one or more components of the manufacturing equipment based on a deviation of one of the visual indicators in at least one portion of at least one row or column of the image from a visual indicator of a respective group) are present in a row of group 502J. At points 530B and 531B the row exhibiting a defect shows that the signal trace is ahead of the rest of the signal traces in the group for the transitions.

Group 501K corresponds to a group of signal traces that in image 500A of FIG. 5A began at an intermediate magnitude, increased exponentially to a high magnitude, and decreased exponentially back to an intermediate magnitude. No defects are present in group 502K of image 500B.

In some embodiments, images 500A and 500B are signal trace data (e.g., image data derived from signal trace data). In some embodiments, detecting a defect includes identifying deviations from expected or desired performance parameters or characteristics. In some embodiments, detecting a defect includes a defect in the operation of at least one of the one or more components of the manufacturing equipment based on a deviation of one of the visual indicators in at least one portion of at least one row or column of the image from a visual indicator of a respective group. In some embodiments, by grouping signal traces and generating an image from the signal traces, the images can be inspected in order to detect defects and classify defects. In some embodiments, the images generated may include groups of visual indicators associated with signal traces with similar signal trace characteristics, where a first dimension of the image corresponds to at least one of a plurality of signal traces, and a second dimension of the image corresponds to a plurality of time values, wherein a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image.

In some embodiments, defects may be due to a broken pump, malfunctioning valve, mis-calibrated sensor, contaminated processing chamber, insufficient power supply, faulty robot arm, misaligned optics, etc. Such defects can lead to various issues such as non-uniform deposition or etching, incorrect material properties, decreased throughput, and ultimately lower yields and increased costs in a manufacturing system.

FIGS. 6A-D are flow diagrams of methods 600A-D associated with image-based signal trace analysis (e.g., detecting defects based on image data generated from signal traces, classifying detected defects based on signal trace ID data from signal traces exhibiting defects, etc.), according to certain embodiments. In some embodiments, methods 600A-D are performed by processing logic that includes hardware (e.g., circuitry, dedicated logic, programmable logic, microcode, processing device, etc.), software (such as instructions run on a processing device, a general-purpose computer system, or a dedicated machine), firmware, microcode, or a combination thereof. In one implementation, method 600A can be performed by a computer system, such as computer system architecture 100 of FIG. 1. In other or similar implementations, one or more operations of method 600A can be performed by one or more other machines not depicted in the figures. In some embodiments, methods 600A-D are performed, at least in part, by predictive system 110. In some embodiments, method 600A is performed by client device 120 (e.g., defect classification component 122, defect classification component 123, etc.) and/or predictive system 110 (e.g., predictive component). In some embodiments, method 600B is performed by server machine 180 (e.g., training engine 182, etc.). In some embodiments, method 600C is performed by predictive server 112 (e.g., predictive component 114) and/or client device 120 (e.g., defect classification component 122, defect classification component 123, etc.). In some embodiments, a non-transitory storage medium stores instructions that when executed by a processing device (e.g., of predictive system 110, of server machine 180, of predictive server 112, of client device 120, etc.), cause the processing device to perform one or more of methods 600A-D.

For simplicity of explanation, methods 600A-D are depicted and described as a series of operations. However, operations in accordance with this disclosure can occur in various orders and/or concurrently and with other operations not presented and described herein. Furthermore, in some embodiments, not all illustrated operations are performed to implement methods 600A-D in accordance with the disclosed subject matter. In addition, those skilled in the art will understand and appreciate that methods 600A-D could alternatively be represented as a series of interrelated states via a state diagram or events.

Figure 6A:
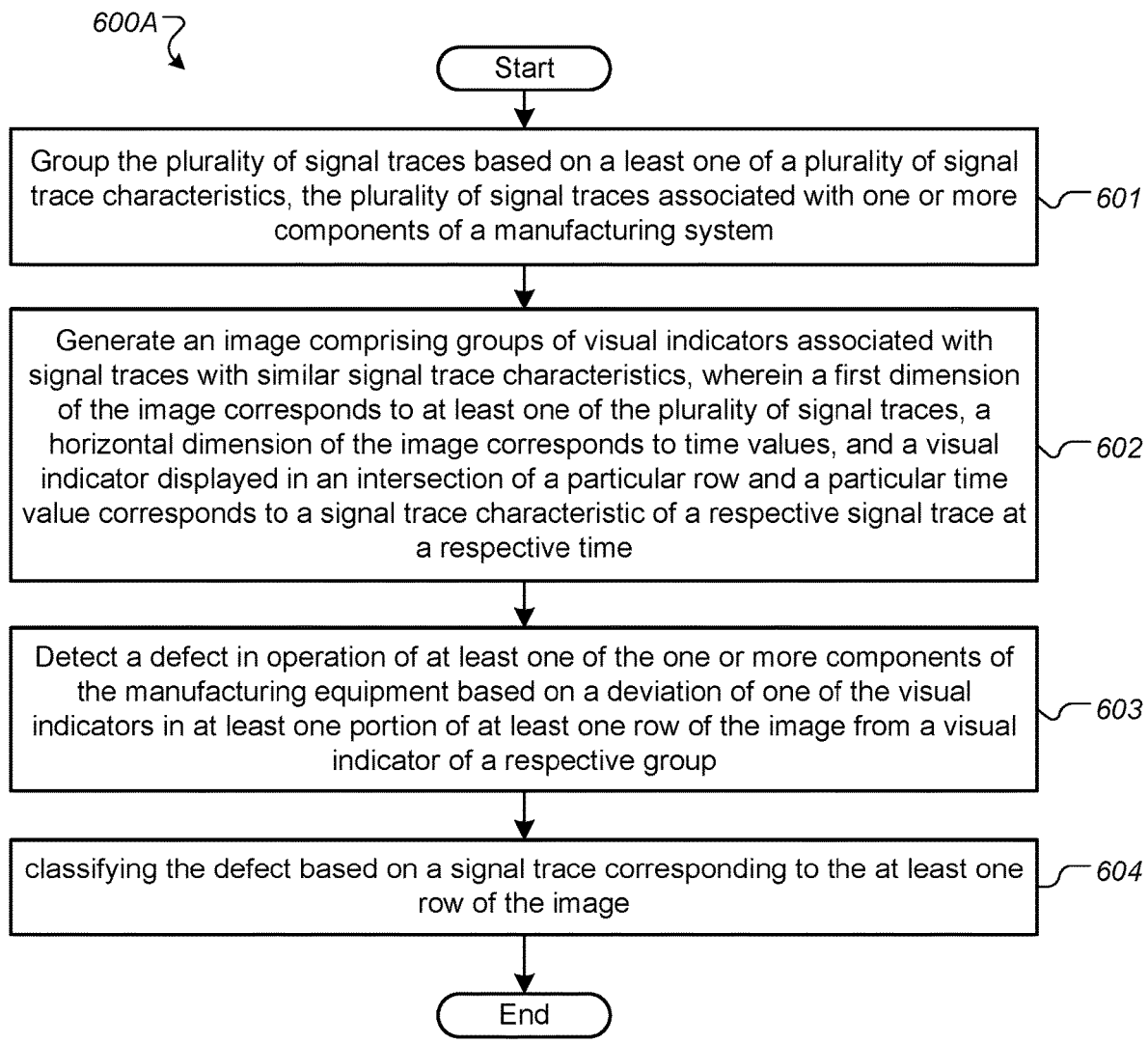
FIGS. 6A-D are flow diagrams of methods associated with image-based signal trace analysis, according to some embodiments.

FIG. 6A is a flow diagram of a method associated with image-based signal trace analysis, according to some embodiments.

Referring to FIG. 6A, in some embodiments, at block 601 the processing logic implementing the method 600A groups multiple signal traces based on at least one of multiple signal trace characteristics, the multiple signal traces associated with one or more components of manufacturing equipment. In some embodiments, grouping the multiple signal traces based on the at least one of multiple signal trace characteristics is based on at least one of type, timing, rate of change, or strength of change. In some embodiments, similarly-behaved signals (e.g., signals that follow similar curves) are grouped together (e.g., are in adjacent rows or columns of the generated image).

In some embodiments, the processing logic may further change a sampling rate of at least one of multiple signal traces provided by one or more sensors associated with one or more components of manufacturing equipment into a uniform time sequence. In some embodiments, signal trace sample rates are not always the same or even uniform in timing.

In some embodiments, the processing logic further normalizes the multiple signal traces to a uniform scaling. In some embodiments, the signal traces may be normalized to either a min/max range of a recipe or an overall min/max range of the sensor signal. In some embodiments, the normalization can be performed such that the min/max values correspond to a min/max of expected ranges or possible min/max values for a given sensor. For example, a temperature sensor may have a range of 0-500 degrees Celsius. A nominal range for that sensor could be a range of 50-150 degrees Celsius. In some embodiments, the sensor signal may be normalized to either range, (e.g., 0=0 C, 255=500 C or 0=50 C, 255=150 C), e.g., based on input from a subject matter expert.

In some embodiments, the signal traces may be digitized (e.g., to 8-bit, 12-bit, or 16-bit). In some embodiments, the processing logic further processes the at least one of the multiple signal traces, where the processing includes at least one of filtering or smoothing the at least one of the multiple signal traces.

In some embodiments, there are, for example, hundreds of sensors may be coupled to each processing chamber and/or tool of a manufacturing system. In some embodiments, sensors generate signal traces. Some signal traces may be setpoint signal traces (e.g., turning things on and off). Some signal traces may be control response to setpoint changes. In some embodiments, for each step of a recipe, a number of signal traces may show transitions at different times and show transitions of different rates. In some embodiments, signal traces are collected during active phases (e.g., during a process) or collected during tool idle times and/or between recipes and recipe steps.

At block 602, the processing logic generates an image comprising groups of visual indicators associated with signal traces with similar signal trace characteristics, where a first dimension of the image corresponds to at least one of the multiple signal traces, and a second dimension of the image corresponds to a plurality of time values, wherein a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image. In some embodiments, arranging the multiple signal traces includes arranging the rows or columns corresponding to the multiple signal traces. In some embodiments, the at least one row or column corresponding to the at least one of the multiple signal traces is repeated in the image to increase a weight of the signal trace.

In some embodiments, a time value may be a timestamp or index in time. For example, an index in time may be an index value that corresponds to a time value (e.g., index value 1 corresponds to zero seconds, index value 2 corresponds to five seconds, index value 3 corresponds to ten seconds, etc.)

In some embodiments, the processing logic further segments the image into multiple image segments based on time, where the multiple image segments include at least one of a signal trace transition or a recipe step.

At block 603, the processing logic detects a defect in operation of at least one of the one or more components of the manufacturing equipment based on a deviation of one of the visual indicators in at least one portion of at least one row or column of the image from a visual indicator of a respective group. In some embodiments, the visual indicator of the respective group may be a visual indicator of a respective group of a reference image. In some embodiments, a reference image may correspond to signal traces from an exemplary tool (e.g., a tool that is calibrated) and/or an exemplary run of a process or operation on the tool.

In some embodiments, the respective group of signal traces may be from a reference image generated by the same component of the manufacturing equipment or from a different component of the manufacturing equipment running the same process (e.g., to be used in chamber and tool fingerprinting, chamber and tool, matching, etc.). In some embodiments, the detecting of a deviation of the one of the visual indicators in the at least one portion of the at least one row or column of the image from a visual indicator of the respective group may be a respective group of signal traces corresponding the generated image. In some embodiments, the detecting of a deviation of the one of the visual indicators in the at least one portion of the at least one row or column of the image from a visual indicator of the respective group may be a respective group of signal traces corresponding a reference image.

In some embodiments, detecting a defect in the operation of at least one of the one or more components of the manufacturing equipment based on a deviation of one of the visual indicators in at least one portion of the at least one of row or column of the image from a visual indicator of a respective group includes providing the image as input to a trained machine learning model and obtaining an output of the trained machine learning model, the output associated with predictive data, where detecting the defect in operation of at least one of the one or more components of the manufacturing equipment based on a deviation of one of the visual indicators in at least one portion of the at least one of row or column the image from a visual indicator of a respective group is associated with the predictive data. In some embodiments, the trained machine learning model is trained with data input comprising historical image data and target output of historical defect detection data.

At block 604, the processing logic classifies the defect based on a signal trace corresponding to the at least one row or column of the image.

In some embodiments, classifying the defect based on the signal trace corresponding to the at least one row or column of the image includes providing a signal trace ID of the signal trace corresponding to the at least one row or column of the image as input to a trained machine learning model and obtaining an output of the trained machine learning model, the output associated with predictive data, where classifying the defect is associated with the predictive data. In some embodiments, the trained machine learning model is trained with data input including historical signal trace ID data and target output of historical defect class data.

In some embodiments, method 600A may be used for chamber and tool matching. For chamber and tool matching, imaged-based signal trace analysis may involve comparing signal traces (e.g., via images generated from signal traces) for different chambers and/or tools running the same process to ensure that all chambers and/or tools behave the same way. For example, tool matching may include calibration of multiple tools to verify that tool operation is within specified tolerances and produces accurate results. In some embodiments, a first generated image may be a reference image (e.g., an exemplary run of a processing operation with a calibrated tool). In some embodiments, the detecting a defect in operation of at least one of the one or more components of the manufacturing equipment may include detecting a defect in operation of an uncalibrated tool based on a deviation of a second generated image (e.g., corresponding to the uncalibrated tool) from the reference image. In some embodiments, the uncalibrated tool is calibrated based on the detected and classified defect (e.g., based on the calibrated tool and the corresponding reference image).

In some embodiments, method 600A may be used for chamber and tool finger printing. For chamber and tool fingerprinting, imaged-based signal trace analysis may involve comparing signal traces (e.g., via images generated from signal traces) for a chamber and/or tool running the same process before and after a preventative maintenance, calibration, and/or the like to ensure that all chambers and/or tools behave properly. For example, tool fingerprinting may include calibration of a tool and verification that tool operation is within specified tolerances and produces accurate results. In some embodiments, a first generated image may be a reference image (e.g., an exemplary run of a processing operation with a calibrated tool). In some embodiments, the detecting a defect in operation of at least one of the one or more components of the manufacturing equipment may include detecting a defect in operation of an tool following preventative maintenance based on a deviation of a second generated image (e.g., corresponding to the tool following the preventative maintenance) from the reference image.

Figure 6B:
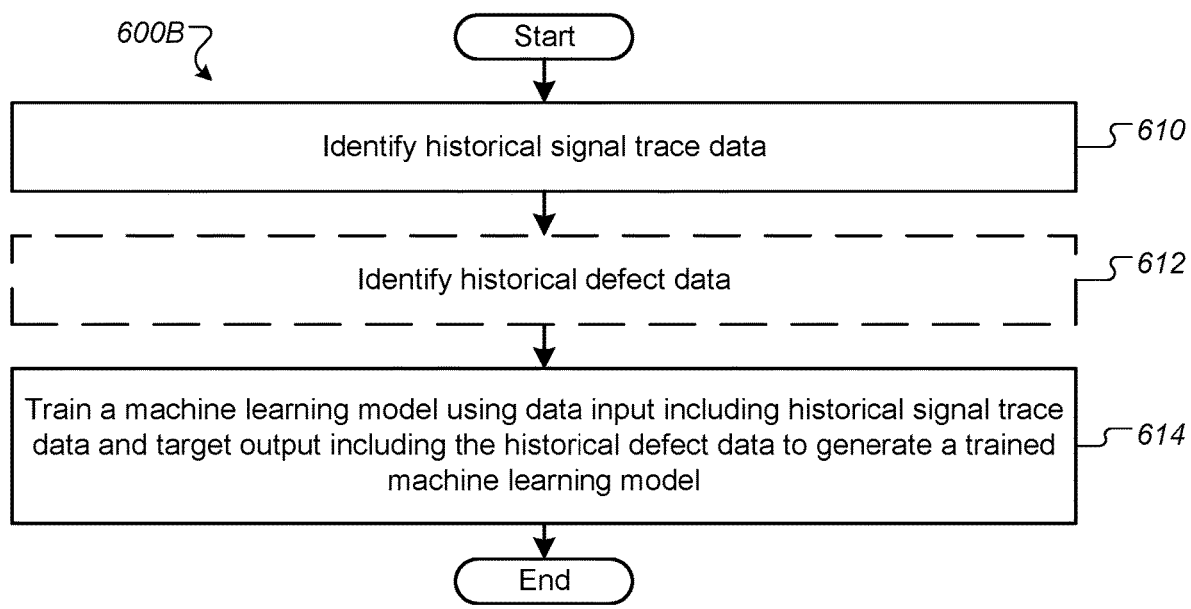

FIG. 6B is a flow diagram of a method for training a machine learning model (e.g., model 190 of FIG. 1) for determining predictive data (e.g., predictive data 160 of FIG. 1) associated with image-based signal trace analysis (e.g., detecting defects, classifying defects, etc.), according to some embodiments.

Referring to FIG. 6B, at block 610 of method 600B, the processing logic identifies historical signal trace data (e.g., historical image data, historical signal trace ID data, historical signal trace data 144, historical sensor data, etc.). Historical signal trace data may include data from historical processing chambers, historical tools, historical sensors, and/or the like. In some embodiments, historical signal trace data 144 may be a reference image reflecting signal traces corresponding to a normal behavior of one or more components of manufacturing equipment (e.g., as in chamber/tool matching). In some embodiments, historical signal trace data 144 may be an image of one or more reference components of the manufacturing equipment. The image reflects signal traces corresponding to a normal behavior of one or more reference components of manufacturing equipment (e.g., components that are properly functioning and/or are properly calibrated. In some embodiments, other identical components of the manufacturing system should behave similarly to the reference components of the manufacturing system. In some embodiments, such an image reflecting the signal traces corresponding to the normal behavior of the one or more reference components of manufacturing equipment is used as historical signal trace data 144 in tool matching. In some embodiments, historical signal trace data 144 may be an image reflecting signal traces corresponding to an abnormal behavior (e.g., a defect in operation of at least one of the one or more components of the manufacturing equipment based on a deviation of one of the visual indicators in at least one portion of at least one row or column of the image from a visual indicator of a respective group) of one or more components of manufacturing equipment.

In some embodiments, at block 612, the processing logic identifies historical defect data (e.g., of signal traces, signal traces exhibiting anomalous behavior, etc.) (e.g., historical defect class data, historical defect detection data, historical defect data 154 of FIG. 1, etc.) of the historical processing chambers, tools, and/or the like. Historical defect data may include historical defect detection data and/or historical defect classification data from historical processing chambers, tools, and/or the like. Defect data, including historical defect data, may include data indicative of a defect, data indicative of a defect classification or user input that indicates the detection of a defect and/or classification of a defect. At least a portion of the historical signal trace data and the historical defect data may be associated with new substrate processing equipment parts (e.g., processing chambers, tools, etc.) (e.g., used for benchmarking). At least a portion of the historical signal trace data and the historical defect data may be associated with manufactured substrates. At least a portion of the historical signal trace data and the historical defect data may be associated with processing chambers, tools, and/or the like.

In some embodiments, historical defect data may be a historical detected defect in operation of at least one of one or more historical components of the historical manufacturing equipment based on a deviation of one of the historical visual indicators in at least one portion of at least one row or column of a historical image from a historical visual indicator of a respective historical group. In some embodiments, historical classification data may be a historical classified defect based on a historical signal trace corresponding to the at least one row or column of the historical image.

At block 614, the processing logic trains a machine learning model using data input including historical signal trace data 144 and/or target output including the historical defect data 154 to generate a trained machine learning model.

In some embodiments, the historical signal trace data is of historical processing chambers or tools and/or the historical defect data corresponds to the historical detected defects, and/or historical classified defects. In some embodiments, the historical signal trace data corresponds to sensors in processing chambers and/or tools that underwent deposition operations or process recipes. In some embodiments, the historical signal trace data includes historical sensor data of processing chambers, tools, etc. and/or the historical defect data corresponds to the historical detected defects, and/or historical classified defects, etc. The historical defect data may be associated with manufacturing system quality, such as calibration of sensors, functionality of sensors, functionality of manufacturing equipment, calibration of manufacturing equipment, functionality of components of the manufacturing system, substrate defects, etc. The historical defect data may be associated with quality of a substrate processing equipment part, such as ability to perform functions correctly, etc.

At block 614, the processing logic trains a machine learning model using data input including historical signal trace data 144 (e.g., historical image data, historical signal trace ID data, etc.) and/or target output including the historical defect data 154 (e.g., historical defect detection data, historical defect classification data, etc.) to generate a trained machine learning model.

In some embodiments, the historical signal trace data is of historical processing chambers or tools and/or the historical defect data corresponds to historical defects (e.g., detected defects and/or classified defects). In some embodiments, the historical signal trace data includes historical sensor data of historical processing chambers or tools and/or the historical defect data corresponding to the historical detected defects, and/or historical classified defects of the processing chambers and/or tools. The historical defect data may be associated with manufacturing equipment quality, such as functionality of manufacturing equipment (e.g., sensors, processing chambers, chemical vapor deposition tools, plasma etching tools, thermal processing tools, physical vapor deposition tools, ion implantation tools, wet processing tools, lithography tools, wafer inspection tools, sputtering tools, chemical mechanical planarization tools, load lock chambers, vacuum pumps, gas delivery systems, etc.), calibration of manufacturing equipment, etc.

At block 614, the machine learning model may be trained using historical signal trace data 144 and/or target output including historical defect data 154 to generate a trained machine learning model configured to detect defects and/or classify defects based on signal trace data. In some embodiments, the trained machine learning model may be configured to predict defect data 152 (e.g., detect defects, classify defects, etc.) based on signal trace data 142 (e.g., signal traces of blocks 601 and 602 of FIG. 6A, image of block 603 of FIG. 6A.

In some embodiments, parameters measured by sensors and represented by signal traces may include, for example, time values, an RF power of the substrate processing operation, a spacing value of the substrate processing operation, a gas flow value of the substrate processing operation, a chamber pressure value of the substrate processing operation, etc.

Figure 6C:
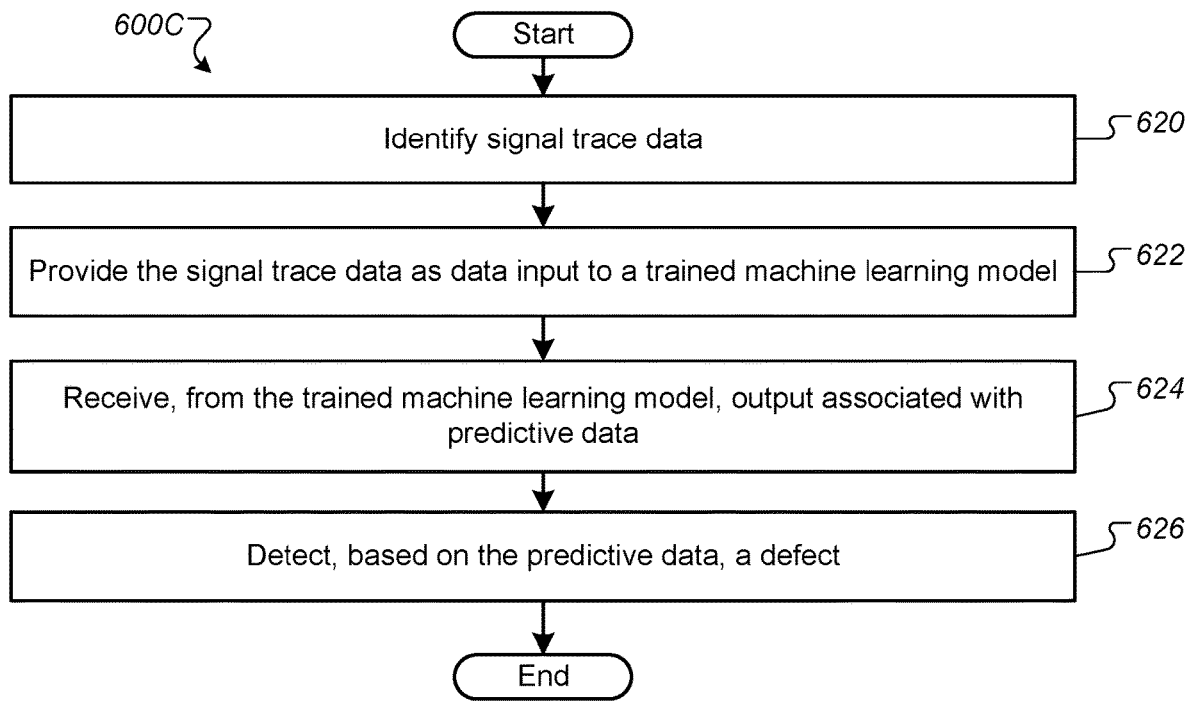

FIG. 6C is a method 600C for using a trained machine learning model (e.g., model 190 of FIG. 1) associated with image-based signal trace analysis (e.g., during substrate manufacturing).

Referring to FIG. 6C, at block 620 of method 600C, the processing logic identifies signal trace data. In some embodiments, the signal trace data of block 620 includes image data, signal trace ID data, etc. In some embodiments, block 620 is similar to blocks 601, 602, and 603 of FIG. 6A.

At block 622, the processing logic provides the signal trace data as data input to a trained machine learning model (e.g., trained via block 614 of FIG. 6B). In some embodiments, the trained machine learning model may be associated with detecting defects and/or classifying defects.

At block 624, the processing logic receives, from the trained machine learning model, output associated with predictive data, where detecting a defect in operation of at least one of the one or more components of the manufacturing equipment based on a deviation of one of the visual indicators in at least one portion of at least one row or column of the image from a visual indicator of a respective group is based on the predictive data.

At block 626, the processing logic detects, based on the predictive data, a defect.

In some embodiments, block 604 of FIG. 6A includes training a machine learning model to detect, based on the signal trace data (e.g., an image generated from signal traces), a defect associated with substrate processing equipment. In some embodiments, block 604 of FIG. 6A includes using the trained machine learning model to detect, based on the signal trace data (e.g., an image generated from signal traces), a defect associated with the substrate processing equipment.

In some embodiments, the signal trace data 142 is image data (e.g., images generated from signal traces) and the trained machine learning model of block 622 was trained using data input including historical image data and/or historical images and target output including historical defect data 154 (e.g., detected defects, defects in images, etc.)

In some embodiments, the signal trace data 142 is image data (e.g., images generated from signal traces, etc.) and the trained machine learning model of block 622 was trained using data input including historical image data and target output including historical defect data 154 that includes historical detected defects of the historical images. The predictive data 160 of block 624 may be associated with predicted defect data (e.g., defect data of the image or defect data of a signal trace, processing chamber, tool, etc.) based on signal trace data.

Figure 6D:
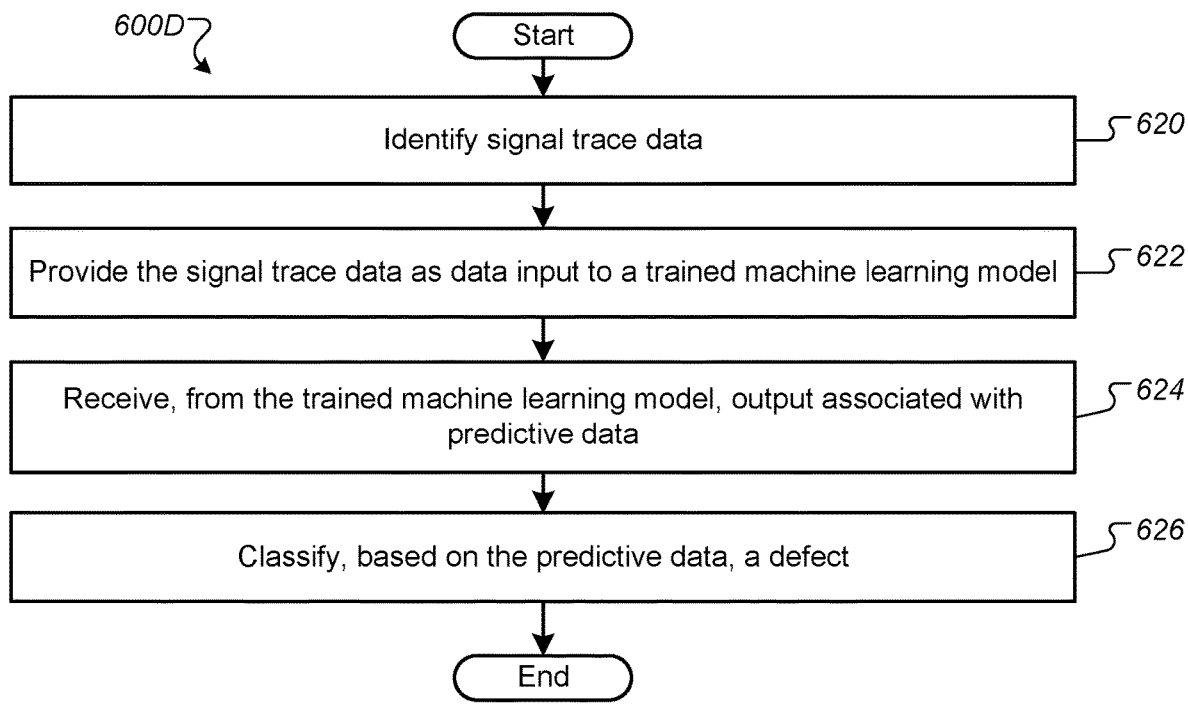

FIG. 6D is a method 600D for using a trained machine learning model (e.g., model 190 of FIG. 1) associated with image-based signal trace analysis (e.g., during substrate manufacturing).

Referring to FIG. 6C, at block 620 of method 600C, the processing logic identifies signal trace data. In some embodiments, the signal trace data of block 620 includes signal trace ID data, image data, etc. In some embodiments, block 620 is similar to blocks 601, 602, and 603 of FIG. 6A.

At block 622, the processing logic provides the signal trace data as data input to a trained machine learning model (e.g., trained via block 614 of FIG. 6B). In some embodiments, the trained machine learning model may be associated with classifying defects and/or detecting defects.

At block 624, the processing logic receives, from the trained machine learning model, output associated with predictive data, where classifying the defect based on the signal trace corresponding to the at least one row or column of the image is based on the predictive data.

At block 626, the processing logic classifies, based on the predictive data, a defect.

In some embodiments, block 604 of FIG. 6A includes training a machine learning model to classify, based on the signal trace data (e.g., a signal trace, identifying information of a signal trace, signal trace ID, etc.), a defect associated with substrate processing equipment. In some embodiments, block 604 of FIG. 6A includes using the trained machine learning model to classify, based on the signal trace data (e.g., a signal trace ID, identifying information of a signal trace, a signal trace, etc.), a defect associated with the substrate processing equipment.

In some embodiments, the signal trace data 142 is signal trace ID data (e.g., signal trace IDs, identifying information of signal traces) and the trained machine learning model of block 622 was trained using data input including historical signal trace ID data and/or historical signal traces and target output including historical defect data 154 (e.g., classified defects, classified defective signal traces, etc.)

In some embodiments, the signal trace data 142 is signal trace ID data (e.g., signal trace IDs, identifying information of signal traces, etc.) and the trained machine learning model of block 622 was trained using data input including historical signal trace ID data and target output including historical defect data 154 that includes historical classified defects of the historical signal traces. The predictive data 160 of block 624 may be associated with predicted defect data (e.g., defect classification data of the image or defect classification data of a signal trace, processing chamber, tool, etc.) based on signal trace data.

Figure 7:
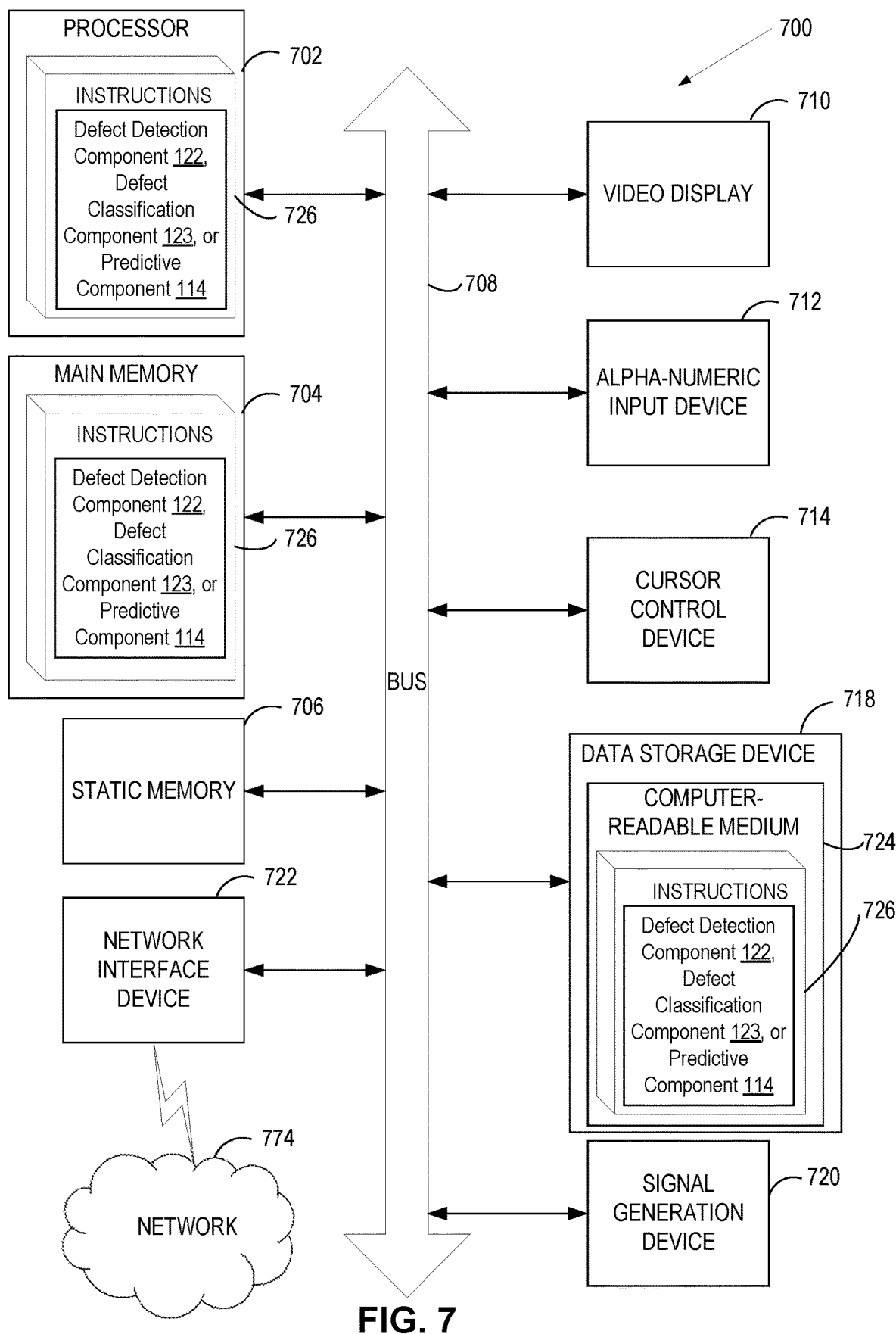
FIG. 7 is a block diagram illustrating a computer system, according to some embodiments.

FIG. 7 is a block diagram illustrating a computer system 700, according to certain embodiments. In some embodiments, the computer system 700 is one or more of client device 120, predictive system 110, server machine 170, server machine 180, predictive server 112, and/or the like.

In some embodiments, computer system 700 is connected (e.g., via a network, such as a Local Area Network (LAN), an intranet, an extranet, or the Internet) to other computer systems. In some embodiments, computer system 700 operates in the capacity of a server or a client computer in a client-server environment, or as a peer computer in a peer-to-peer or distributed network environment. In some embodiments, computer system 700 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 includes a processing device 702, a volatile memory 704 (e.g., Random Access Memory (RAM)), a non-volatile memory 706 (e.g., Read-Only Memory (ROM) or Electrically-Erasable Programmable ROM (EEPROM)), and a data storage device 718, which communicate with each other via a bus 708.

In some embodiments, processing device 702 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 700 further includes a network interface device 722 (e.g., coupled to network 774). In some embodiments, computer system 700 also includes a video display unit 710 (e.g., a liquid-crystal display (LCD)), an alphanumeric input device 712 (e.g., a keyboard), a cursor control device 714 (e.g., a mouse), and a signal generation device 720.

In some implementations, data storage device 718 includes a non-transitory computer-readable storage medium 724 on which store instructions 726 encoding any one or more of the methods or functions described herein, including instructions encoding components of FIG. 1 (e.g., defect classification component 122, defect classification component 123, predictive component 114, etc.) and for implementing methods described herein (e.g., one or more of methods 600A-D).

In some embodiments, instructions 726 also reside, completely or partially, within volatile memory 704 and/or within processing device 702 during execution thereof by computer system 700, hence, in some embodiments, volatile memory 704 and processing device 702 also constitute machine-readable storage media.

While non-transitory computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as application-specific integrated circuits (ASICS), FPGAS, DSPs or similar devices. In addition, the methods, components, and features can be implemented by firmware modules or functional circuitry within hardware devices. Further, the methods, components, and features can be implemented in any combination of hardware devices and computer program components, or in computer programs. Unless specifically stated otherwise, terms such as "changing," "resampling," "grouping," "arranging," "generating," "detecting," "determining," "classifying," "processing," "segmenting," "providing," "obtaining" "identifying," "assigning," "receiving," "updating," "causing," "performing," "accessing," "adding," "using," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method comprising:
grouping a plurality of signal traces based on at least one of a plurality of signal trace characteristics, the plurality of signal traces associated with one or more components of manufacturing equipment;
generating an image comprising groups of visual indicators associated with signal traces with similar signal trace characteristics, wherein a first dimension of the image corresponds to at least one of the plurality of signal traces, and a second dimension of the image corresponds to a plurality of time values, wherein a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image;
detecting a defect in operation of at least one of the one or more components of the manufacturing equipment based on a deviation of one of the visual indicators in at least one portion of at least one row or column of the image from a visual indicator of a respective group; and
classifying the defect based on a signal trace corresponding to the at least one row or column of the image.

2. The method of claim 1, further comprising normalizing the plurality of signal traces to a uniform scaling.

3. The method of claim 1, further comprising processing the at least one of the plurality of signal traces, wherein the processing comprises at least one of filtering or smoothing the at least one of the plurality of signal traces.

4. The method of claim 1, wherein the at least one row or column corresponding to the at least one of the plurality of signal traces is repeated in the image to increase a weight of the signal trace.

5. The method of claim 1, wherein arranging the plurality of signal traces based on the at least one of a plurality of signal trace characteristics is based on at least one of type, timing, rate of change, or strength of change.

6. The method of claim 1, further comprising segmenting the image into a plurality of image segments based on time, wherein the plurality of image segments comprise at least one of a signal trace transition or a recipe step.

7. The method of claim 1, wherein detecting the defect in operation of the at least one of the one or more components of the manufacturing equipment based on the deviation of one of the visual indicators in the at least one portion of the at least one row or column of the image from the visual indicator of the respective group comprises:
providing the image as input to a trained machine learning model; and
obtaining an output of the trained machine learning model, the output associated with predictive data, wherein detecting the defect in operation of the at least one of the one or more components of the manufacturing equipment based on the deviation of one of the visual indicators in the at least one portion of the at least one row or column of the image from the visual indicator of the respective group is associated with the predictive data.

8. The method of claim 7, wherein the trained machine learning model is trained with data input comprising historical image data and target output of historical defect detection data.

9. The method of claim 1, wherein classifying the defect based on the signal trace corresponding to the at least one row or column of the image comprises:
providing a signal trace ID of the signal trace corresponding to the at least one row or column of the image as input to a trained machine learning model; and
obtaining an output of the trained machine learning model, the output associated with predictive data, wherein classifying the defect is associated with the predictive data.

10. The method of claim 9, wherein the trained machine learning model is trained with data input comprising historical signal trace ID data and target output of historical defect class data.

11. A system comprising:
a memory; and
a processing device coupled to the memory, the processing device to:
group a plurality of signal traces based on at least one of a plurality of signal trace characteristics, the plurality of signal traces associated with one or more components of manufacturing equipment;
generate an image comprising groups of visual indicators associated with signal traces with similar signal trace characteristics, wherein a first dimension of the image corresponds to at least one of the plurality of signal traces, and a second dimension of the image corresponds to a plurality of time values, wherein a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image;
detect a defect in operation of at least one of the one or more components of the manufacturing equipment based on a deviation of one of the visual indicators in at least one portion of at least one row or column of the image from a visual indicator of a respective group; and
classify the defect based on a signal trace corresponding to the at least one row or column of the image.

12. The system of claim 11, wherein detecting the defect in operation of the at least one of the one or more components of the manufacturing equipment based on the deviation of one of the visual indicators in the at least one portion of the at least one row or column of the image from the visual indicator of a respective group comprises:
providing the image as input to a trained machine learning model; and
obtaining an output of the trained machine learning model, the output associated with predictive data, wherein detecting the defect in operation of the at least one of the one or more components of the manufacturing equipment based on the deviation of one of the visual indicators in the at least one portion of the at least one row or column of the image from the visual indicator of the respective group is associated with the predictive data.

13. The system of claim 12, wherein the trained machine learning model is trained with data input comprising historical image data and target output of historical defect detection data.

14. The system of claim 11, wherein classifying the defect based on the signal trace corresponding to the at least one row or column of the image comprises:
providing a signal trace ID of the signal trace corresponding to the at least one row or column of the image as input to a trained machine learning model; and
obtaining an output of the trained machine learning model, the output associated with predictive data, wherein classifying the defect is associated with the predictive data.

15. The system of claim 14, wherein the trained machine learning model is trained with data input comprising historical signal trace ID data and target output of historical defect class data.

16. A non-transitory computer-readable storage medium storing instructions which, when executed, cause a processing device to perform operations comprising:
grouping a plurality of signal traces based on at least one of a plurality of signal trace characteristics, the plurality of signal traces associated with one or more components of manufacturing equipment;
generating an image comprising groups of visual indicators associated with signal traces with similar signal trace characteristics, wherein a first dimension of the image corresponds to at least one of the plurality of signal traces, and a second dimension of the image corresponds to a plurality of time values, wherein a first visual indicator in the groups of visual indicators corresponds to a signal trace characteristic of a first signal trace of the plurality of signal traces at a first time value of the plurality of time values, and wherein the first signal trace corresponds to a first row or column with respect to the first dimension in the image, and the first time value corresponds to a first position with respect to the second dimension of the image;
detecting a defect in operation of at least one of the one or more components of the manufacturing equipment based on a deviation of one of the visual indicators in at least one portion of at least one row or column of the image from a visual indicator of a respective group; and
classifying the defect based on a signal trace corresponding to the at least one row or column of the image.

17. The non-transitory computer-readable storage medium of claim 16, wherein detecting the defect in operation of the at least one of the one or more components of the manufacturing equipment based on the deviation of one of the visual indicators in the at least one portion of the at least one row or column of the image from the visual indicator of the respective group comprises:
providing the image as input to a trained machine learning model; and
obtaining an output of the trained machine learning model, the output associated with predictive data, wherein detecting the defect in operation of the at least one of the one or more components of the manufacturing equipment based on the deviation of one of the visual indicators in the at least one portion of the at least one row or column of the image from the visual indicator of the respective group is associated with the predictive data.

18. The non-transitory computer-readable storage medium of claim 17, wherein the trained machine learning model is trained with data input comprising historical image data and target output of historical defect detection data.

19. The non-transitory computer-readable storage medium of claim 16, wherein classifying the defect based on the signal trace corresponding to the at least one row or column of the image comprises:
providing a signal trace ID of the signal trace corresponding to the at least one row or column of the image as input to a trained machine learning model; and
obtaining an output of the trained machine learning model, the output associated with predictive data, wherein classifying the defect is associated with the predictive data.

20. The non-transitory computer-readable storage medium of claim 19, wherein the trained machine learning model is trained with data input comprising historical signal trace ID data and target output of historical defect class data.

* * * * *